United States Patent
Matečič Mušanić et al.

(10) Patent No.: US 12,509,456 B2
(45) Date of Patent: Dec. 30, 2025

(54) SOLID STATE FORMS OF RIPRETINIB

(71) Applicant: Deciphera Pharmaceuticals, LLC, Waltham, MA (US)

(72) Inventors: Sanja Matečič Mušanić, Zagreb (HR); Lara Jurković, Pula (HR); Valentina Travančić, Zagreb (HR)

(73) Assignee: Deciphera Pharmaceuticals, LLC, Waltham, MA (US)

( * ) Notice: Subject to any disclaimer, the term of this patent is extended or adjusted under 35 U.S.C. 154(b) by 621 days.

(21) Appl. No.: 17/437,552

(22) PCT Filed: Mar. 11, 2020

(86) PCT No.: PCT/US2020/021957
§ 371 (c)(1),
(2) Date: Sep. 9, 2021

(87) PCT Pub. No.: WO2020/185812
PCT Pub. Date: Sep. 17, 2020

(65) Prior Publication Data
US 2022/0144825 A1    May 12, 2022

Related U.S. Application Data

(60) Provisional application No. 62/892,045, filed on Aug. 27, 2019, provisional application No. 62/831,816, filed on Apr. 10, 2019, provisional application No. 62/823,039, filed on Mar. 25, 2019, provisional application No. 62/816,547, filed on Mar. 11, 2019.

(51) Int. Cl.
*C07D 471/04*    (2006.01)

(52) U.S. Cl.
CPC ................... *C07D 471/04* (2013.01)

(58) Field of Classification Search
CPC ......... C07D 471/04; A61P 35/00; A61P 35/04
See application file for complete search history.

(56) References Cited

U.S. PATENT DOCUMENTS

| | | |
|---|---|---|
| 3,528,980 A | 9/1970 | Islip |
| 3,818,024 A | 6/1974 | Krenzer |
| 3,939,122 A | 2/1976 | Merten et al. |
| 3,949,002 A | 4/1976 | Feasey et al. |
| 4,093,624 A | 6/1978 | Revankar et al. |
| 4,296,237 A | 10/1981 | Cragoe, Jr. et al. |
| 4,366,189 A | 12/1982 | Burdeska et al. |
| 4,432,992 A | 2/1984 | Cragoe, Jr. et al. |
| 4,525,450 A | 6/1985 | Itoh et al. |
| 4,816,454 A | 3/1989 | Zoller et al. |
| 5,103,014 A | 4/1992 | Musser et al. |
| 5,162,360 A | 11/1992 | Creswell et al. |
| 5,189,045 A | 2/1993 | Peglion et al. |
| 5,319,099 A | 6/1994 | Kamata et al. |
| 5,494,925 A | 2/1996 | Court et al. |
| 5,514,691 A | 5/1996 | Chan et al. |
| 5,614,532 A | 3/1997 | Carling et al. |
| 5,621,010 A | 4/1997 | Sueda et al. |
| 5,658,924 A | 8/1997 | Matsuura et al. |
| 5,721,231 A | 2/1998 | Moriwaki et al. |
| 5,811,456 A | 9/1998 | Seman et al. |
| 6,020,357 A | 2/2000 | Pinto et al. |
| 6,028,085 A | 2/2000 | Bromidge |
| 6,080,763 A | 6/2000 | Regan et al. |
| 6,123,964 A | 9/2000 | Asgharnejad et al. |
| 6,147,088 A | 11/2000 | Goulet et al. |
| 6,197,599 B1 | 3/2001 | Chin et al. |
| 6,235,786 B1 | 5/2001 | Dai et al. |
| 6,294,573 B1 | 9/2001 | Curtin et al. |
| 6,319,921 B1 | 11/2001 | Cirillo et al. |
| 6,410,254 B1 | 6/2002 | Finer et al. |
| 6,500,628 B1 | 12/2002 | Robison |
| 6,525,046 B1 | 2/2003 | Cirillo et al. |
| 6,645,990 B2 | 11/2003 | Askew et al. |
| 6,763,607 B2 | 7/2004 | Beyerinck et al. |
| 6,916,924 B2 | 7/2005 | Tan et al. |
| 6,973,741 B2 | 12/2005 | Beyerinck et al. |
| 7,071,199 B1 | 7/2006 | Hirst et al. |
| 7,135,550 B2 | 11/2006 | Come et al. |
| 7,144,911 B2 | 12/2006 | Flynn et al. |
| 7,202,257 B2 | 4/2007 | Flynn et al. |
| 7,211,575 B2 | 5/2007 | Moss et al. |
| 7,279,576 B2 | 10/2007 | Flynn et al. |
| 7,342,037 B2 | 3/2008 | Flynn et al. |
| 7,531,566 B2 | 5/2009 | Flynn et al. |
| 7,666,895 B2 | 2/2010 | Flynn et al. |
| 7,737,283 B2 | 6/2010 | Flynn et al. |
| 7,790,756 B2 | 9/2010 | Flynn et al. |
| 7,897,762 B2 | 3/2011 | Flynn et al. |
| 8,143,293 B2 | 3/2012 | Flynn et al. |
| 8,163,756 B2 | 4/2012 | Flynn et al. |
| 8,188,113 B2 | 5/2012 | Flynn et al. |
| 8,278,331 B2 | 10/2012 | Flynn et al. |
| 8,343,550 B2 | 1/2013 | Beyerinck et al. |
| 8,461,179 B1 | 6/2013 | Flynn et al. |
| 8,486,951 B2 | 7/2013 | Flynn et al. |
| 8,569,319 B2 | 10/2013 | Flynn et al. |
| 8,586,565 B2 | 11/2013 | Flynn et al. |
| 8,637,672 B2 | 1/2014 | Flynn et al. |

(Continued)

FOREIGN PATENT DOCUMENTS

| | | |
|---|---|---|
| CN | 101528744A A | 9/2009 |
| CN | 101553232A A | 10/2009 |

(Continued)

OTHER PUBLICATIONS

Croce, C. M. "Oncogenes and Cancer" 2008, New England Journal of Medicine, vol. 358, pp. 502-511. (Year: 2013).*

(Continued)

*Primary Examiner* — Eric Olson
*Assistant Examiner* — Benjamin M Brandsen
(74) *Attorney, Agent, or Firm* — Goodwin Procter LLP

(57) ABSTRACT

The present disclosure relates to solid state forms of ripretinib, processes for preparation thereof, as well as a pharmaceutical composition including the same.

13 Claims, 10 Drawing Sheets

(56) References Cited

U.S. PATENT DOCUMENTS

| | | |
|---|---|---|
| 8,669,289 B2 | 3/2014 | Li |
| 8,741,911 B2 | 6/2014 | Allgeier et al. |
| 8,828,443 B2 | 9/2014 | Beyerinck et al. |
| 8,921,565 B2 | 12/2014 | Flynn et al. |
| 8,940,756 B2 | 1/2015 | Flynn et al. |
| 9,012,635 B2 | 4/2015 | Flynn et al. |
| 9,133,183 B2 | 9/2015 | Flynn et al. |
| 9,181,223 B2 | 11/2015 | Kaufman et al. |
| 9,187,474 B2 | 11/2015 | Flynn et al. |
| 9,193,719 B2 | 11/2015 | Flynn et al. |
| 9,248,584 B2 | 2/2016 | Friesen et al. |
| 9,265,731 B2 | 2/2016 | Ray et al. |
| 9,309,224 B2 | 4/2016 | Flynn et al. |
| 9,334,267 B2 | 5/2016 | Flynn et al. |
| 9,339,467 B2 | 5/2016 | Beyerinck et al. |
| 9,382,228 B2 | 7/2016 | Flynn et al. |
| 9,387,202 B2 | 7/2016 | Flynn et al. |
| 9,457,019 B2 | 10/2016 | Flynn et al. |
| 9,545,407 B2 | 1/2017 | Shu et al. |
| 9,724,664 B2 | 8/2017 | Friesen et al. |
| 10,300,443 B2 | 5/2019 | Friesen et al. |
| 10,383,941 B2 | 8/2019 | Beyerinck et al. |
| 10,675,602 B2 | 6/2020 | Friesen et al. |
| 10,966,966 B2 | 4/2021 | Soto et al. |
| 11,103,507 B2 | 8/2021 | Flynn et al. |
| RE48,731 E | 9/2021 | Flynn et al. |
| 11,185,535 B2 * | 11/2021 | Kaufman ............ A61K 9/1682 |
| 11,266,635 B2 | 3/2022 | Soto et al. |
| 11,344,536 B1 | 5/2022 | Soto et al. |
| 11,395,818 B2 | 7/2022 | Kaufman et al. |
| 11,426,390 B2 | 8/2022 | Soto et al. |
| 11,433,056 B1 | 9/2022 | Soto et al. |
| 11,518,758 B2 | 12/2022 | Flynn et al. |
| 11,529,336 B2 | 12/2022 | Soto et al. |
| 11,530,206 B2 | 12/2022 | Flynn et al. |
| 11,534,432 B2 | 12/2022 | Soto et al. |
| 11,576,903 B2 | 2/2023 | Kaufman et al. |
| 11,576,904 B2 | 2/2023 | Soto et al. |
| 11,590,134 B2 | 2/2023 | Flynn et al. |
| 11,612,591 B2 | 3/2023 | Kaufman et al. |
| 11,679,110 B2 | 6/2023 | Flynn et al. |
| 11,779,572 B1 | 10/2023 | Wang et al. |
| 11,793,795 B2 | 10/2023 | Kaufman et al. |
| 11,801,237 B2 | 10/2023 | Kaufman et al. |
| 11,813,251 B2 | 11/2023 | Soto et al. |
| 2002/0058678 A1 | 5/2002 | Cirillo et al. |
| 2002/0077486 A1 | 6/2002 | Scarborough et al. |
| 2002/0165394 A1 | 11/2002 | Dumas et al. |
| 2002/0193405 A1 | 12/2002 | Askew et al. |
| 2003/0060455 A1 | 3/2003 | Moss et al. |
| 2003/0105139 A1 | 6/2003 | Gaster et al. |
| 2003/0144278 A1 | 7/2003 | Riedl et al. |
| 2003/0181442 A1 | 9/2003 | Riedl et al. |
| 2003/0207870 A1 | 11/2003 | Dumas et al. |
| 2003/0216396 A1 | 11/2003 | Dumas et al. |
| 2003/0232865 A1 | 12/2003 | Cirillo et al. |
| 2004/0043388 A1 | 3/2004 | Come et al. |
| 2004/0067938 A1 | 4/2004 | Zhang et al. |
| 2004/0102636 A1 | 5/2004 | Miller et al. |
| 2004/0157827 A1 | 8/2004 | Pevarello et al. |
| 2004/0167224 A1 | 8/2004 | Ozaki et al. |
| 2004/0171075 A1 | 9/2004 | Flynn et al. |
| 2004/0180906 A1 | 9/2004 | Flynn et al. |
| 2004/0229937 A1 | 11/2004 | Dumas et al. |
| 2005/0014753 A1 | 1/2005 | Ding et al. |
| 2005/0148605 A1 | 7/2005 | Grotzfeld et al. |
| 2005/0165024 A1 | 7/2005 | Milanov et al. |
| 2005/0165031 A1 | 7/2005 | Grotzfeld et al. |
| 2005/0165074 A1 | 7/2005 | Grotzfeld et al. |
| 2005/0171171 A1 | 8/2005 | Mehta et al. |
| 2005/0171172 A1 | 8/2005 | Lai et al. |
| 2005/0192314 A1 | 9/2005 | Mehta et al. |
| 2005/0197371 A1 | 9/2005 | Milanov et al. |
| 2005/0256174 A1 | 11/2005 | Wood et al. |
| 2005/0261315 A1 | 11/2005 | Mehta et al. |
| 2005/0267182 A1 | 12/2005 | Milanov et al. |
| 2005/0288286 A1 | 12/2005 | Flynn et al. |
| 2006/0229337 A1 | 10/2006 | Brittelli et al. |
| 2006/0247186 A1 | 11/2006 | Carter et al. |
| 2007/0037794 A1 | 2/2007 | Ungashe et al. |
| 2007/0078121 A1 | 4/2007 | Flynn et al. |
| 2007/0155764 A1 | 7/2007 | Lang et al. |
| 2007/0179130 A1 | 8/2007 | Bannen |
| 2007/0191336 A1 | 8/2007 | Flynn et al. |
| 2007/0244120 A1 | 10/2007 | Dumas et al. |
| 2007/0293685 A1 | 12/2007 | Fritch et al. |
| 2008/0009527 A1 | 1/2008 | Dumas et al. |
| 2008/0045531 A1 | 2/2008 | Flynn et al. |
| 2008/0045706 A1 | 2/2008 | Flynn et al. |
| 2008/0064717 A1 | 3/2008 | Iyengar et al. |
| 2008/0090856 A1 | 4/2008 | Flynn et al. |
| 2008/0113967 A1 | 5/2008 | Flynn et al. |
| 2008/0114006 A1 | 5/2008 | Flynn et al. |
| 2008/0132506 A1 | 6/2008 | Flynn et al. |
| 2008/0176846 A1 | 7/2008 | Chianelli et al. |
| 2008/0187978 A1 | 8/2008 | Flynn et al. |
| 2008/0194836 A1 | 8/2008 | Gharbaoui et al. |
| 2008/0200530 A1 | 8/2008 | Unett et al. |
| 2008/0207699 A1 | 8/2008 | Hoelzemann et al. |
| 2008/0214545 A1 | 9/2008 | Lee et al. |
| 2008/0220497 A1 | 9/2008 | Flynn et al. |
| 2008/0221192 A1 | 9/2008 | Wan et al. |
| 2008/0248487 A1 | 10/2008 | Flynn et al. |
| 2008/0248548 A1 | 10/2008 | Flynn et al. |
| 2008/0300281 A1 | 12/2008 | Dumas et al. |
| 2009/0069310 A1 | 3/2009 | Flynn et al. |
| 2009/0075986 A1 | 3/2009 | Flynn et al. |
| 2009/0093526 A1 | 4/2009 | Miller et al. |
| 2009/0099190 A1 | 4/2009 | Flynn et al. |
| 2009/0105230 A1 | 4/2009 | Flynn et al. |
| 2009/0124633 A1 | 5/2009 | Jonczyk et al. |
| 2009/0137021 A1 | 5/2009 | Flynn et al. |
| 2009/0192307 A1 | 7/2009 | Michelotti et al. |
| 2009/0215799 A1 | 8/2009 | Stieber et al. |
| 2009/0281089 A1 | 11/2009 | Gunzner et al. |
| 2009/0312349 A1 | 12/2009 | Flynn et al. |
| 2009/0325945 A1 | 12/2009 | Niculescu-Duvaz et al. |
| 2010/0075971 A1 | 3/2010 | Dumas et al. |
| 2010/0160292 A1 | 6/2010 | Whitney et al. |
| 2010/0209420 A1 | 8/2010 | Lamb et al. |
| 2010/0286215 A1 | 11/2010 | Pelcman et al. |
| 2010/0298290 A1 | 11/2010 | Anand et al. |
| 2011/0077240 A1 | 3/2011 | Mannion et al. |
| 2011/0092461 A1 | 4/2011 | Gunzner et al. |
| 2011/0098293 A1 | 4/2011 | Mannion et al. |
| 2011/0112193 A1 | 5/2011 | Nilsson et al. |
| 2011/0124640 A1 | 5/2011 | Liu et al. |
| 2011/0136760 A1 | 6/2011 | Flynn et al. |
| 2011/0136809 A1 | 6/2011 | Lee et al. |
| 2011/0183997 A1 | 7/2011 | Chianelli et al. |
| 2011/0195110 A1 | 8/2011 | Smith et al. |
| 2011/0237563 A1 | 9/2011 | Costantini |
| 2012/0094980 A1 | 4/2012 | Gunzner et al. |
| 2012/0114605 A1 | 5/2012 | Li |
| 2012/0214808 A1 | 8/2012 | Bloxham et al. |
| 2012/0225057 A1 | 9/2012 | Flynn et al. |
| 2012/0270878 A1 | 10/2012 | Miller et al. |
| 2012/0289540 A1 | 11/2012 | Flynn et al. |
| 2013/0071403 A1 | 3/2013 | Rolland et al. |
| 2013/0225581 A1 | 8/2013 | Furuta et al. |
| 2013/0296326 A1 | 11/2013 | Pollock |
| 2014/0088075 A1 | 3/2014 | Flynn et al. |
| 2014/0107100 A1 | 4/2014 | Rice et al. |
| 2014/0147415 A1 | 5/2014 | Moussy et al. |
| 2014/0179632 A1 | 6/2014 | Mannion et al. |
| 2014/0296248 A1 | 10/2014 | Bernards et al. |
| 2014/0296267 A1 | 10/2014 | Fry et al. |
| 2014/0336210 A1 | 11/2014 | Christopher et al. |
| 2015/0031648 A1 | 1/2015 | Le Tiran et al. |
| 2015/0073141 A1 | 3/2015 | Teegarden et al. |
| 2015/0105550 A1 | 4/2015 | Gunzner et al. |
| 2015/0111879 A1 | 4/2015 | Gunzner et al. |
| 2015/0133462 A1 | 5/2015 | Singh et al. |
| 2015/0218652 A1 | 8/2015 | Doebele et al. |

(56) References Cited

U.S. PATENT DOCUMENTS

| | | |
|---|---|---|
| 2015/0225369 A1 | 8/2015 | Wucherer-Plietker et al. |
| 2015/0246033 A1 | 9/2015 | Flynn et al. |
| 2015/0275306 A1 | 10/2015 | Bernards et al. |
| 2015/0320759 A1 | 11/2015 | Flynn et al. |
| 2016/0009709 A1 | 1/2016 | Cheve et al. |
| 2016/0045532 A1 | 2/2016 | Roberts et al. |
| 2016/0152569 A1 | 6/2016 | Gunzner-Toste et al. |
| 2016/0166679 A1 | 6/2016 | Low et al. |
| 2016/0222012 A1 | 8/2016 | Ruan |
| 2016/0243150 A1 | 8/2016 | Wood et al. |
| 2016/0289663 A1 | 10/2016 | Kiyokawa et al. |
| 2016/0374990 A1 | 12/2016 | Teegarden et al. |
| 2017/0015627 A1 | 1/2017 | Gunzner-Toste et al. |
| 2017/0121321 A1 | 5/2017 | Crews et al. |
| 2017/0174750 A1 | 6/2017 | Lim et al. |
| 2017/0349880 A1 | 12/2017 | Doucey et al. |
| 2017/0360791 A1 | 12/2017 | Joshi-Hangal et al. |
| 2018/0000771 A1 | 1/2018 | Inoue et al. |
| 2018/0071302 A1 | 3/2018 | Abella et al. |
| 2018/0071303 A1 | 3/2018 | Abella et al. |
| 2019/0091217 A1 | 3/2019 | Flynn et al. |
| 2020/0129489 A1 | 4/2020 | Flynn et al. |
| 2020/0253973 A1 | 8/2020 | Flynn et al. |
| 2020/0352920 A1 | 11/2020 | Flynn et al. |
| 2020/0354346 A1 | 11/2020 | Flynn et al. |
| 2020/0354352 A1 | 11/2020 | Flynn et al. |
| 2021/0015801 A1 | 1/2021 | Flynn et al. |

FOREIGN PATENT DOCUMENTS

| | | | |
|---|---|---|---|
| CN | 102731385 | A | 10/2012 |
| CN | 105461699 | A | 4/2016 |
| CN | 106573002 | A | 4/2017 |
| CN | 106822128 | A | 6/2017 |
| CN | 108379591 | A | 8/2018 |
| CN | 111328283 | A | 6/2020 |
| CN | 114902895 | A | 8/2022 |
| DE | 1115350 | B | 10/1961 |
| DE | 4343831 | A1 | 6/1995 |
| EP | 0021228 | A1 | 1/1981 |
| EP | 0025232 | A1 | 3/1981 |
| EP | 0154190 | A1 | 9/1985 |
| EP | 0661276 | A1 | 7/1995 |
| EP | 0692483 | A4 | 11/1995 |
| EP | 0739884 | A2 | 10/1996 |
| EP | 0867435 | A1 | 9/1998 |
| EP | 0927555 | A1 | 7/1999 |
| EP | 0928790-A 1 | | 7/1999 |
| EP | 0956855 | A1 | 11/1999 |
| EP | 1281399 | A2 | 2/2003 |
| EP | 2858646 | A1 | 4/2015 |
| EP | 2827900 | B1 | 3/2018 |
| FR | 2337554 | A1 | 8/1977 |
| FR | 2396549 | A2 | 2/1979 |
| GB | 971307 | A | 9/1964 |
| GB | 1410279 | A | 10/1975 |
| GB | 2220206 | A | 1/1990 |
| JP | 59-177557 | A | 8/1984 |
| JP | 9-221476 | | 8/1997 |
| JP | 2000275886 | A | 10/2000 |
| JP | 2001-2687 | A | 1/2001 |
| JP | 2010-506948 | A | 3/2010 |
| JP | 2015-520186 | A | 7/2015 |
| JP | 2015-532296 | A | 11/2015 |
| JP | 59-15247 | B2 | 5/2016 |
| KR | 20130065368 | A | 6/2013 |
| KR | 20150053894 | A | 5/2015 |
| MX | 2019/014343 | A | 8/2020 |
| WO | WO-1991/19708 | A1 | 12/1991 |
| WO | WO-1992/08693 | A1 | 5/1992 |
| WO | WO-1994/18176 | A1 | 8/1994 |
| WO | WO-1994/21617 | | 9/1994 |
| WO | WO-1994/24095 | A1 | 10/1994 |
| WO | WO-1995/006044 | A1 | 3/1995 |
| WO | WO-1995/15954 | A1 | 6/1995 |
| WO | WO-1995/29902 | A1 | 11/1995 |
| WO | WO-1995/34540 | A1 | 12/1995 |
| WO | WO-1996/16046 | A2 | 5/1996 |
| WO | WO-1996/19477 | A1 | 6/1996 |
| WO | WO-1996/023783 | A1 | 8/1996 |
| WO | WO-1997/34900 | A1 | 9/1997 |
| WO | WO-1997/037989 | A2 | 10/1997 |
| WO | WO-1997/40028 | A1 | 10/1997 |
| WO | WO-1997/045400 | A1 | 12/1997 |
| WO | WO-1998/22103 | A1 | 5/1998 |
| WO | WO-1998/52558 | A1 | 11/1998 |
| WO | WO-1999/15164 | A1 | 4/1999 |
| WO | WO-1999/23091 | A1 | 5/1999 |
| WO | WO-1999/23093 | A1 | 5/1999 |
| WO | WO-1999/3 7622 | A1 | 7/1999 |
| WO | WO-1999/32106 | | 7/1999 |
| WO | WO-1999/32110 | A1 | 7/1999 |
| WO | WO-1999/32111 | | 7/1999 |
| WO | WO-1999/32455 | | 7/1999 |
| WO | WO-1999/59959 | A1 | 11/1999 |
| WO | WO-2000/06550 | A1 | 2/2000 |
| WO | WO-2000/07980 | A1 | 2/2000 |
| WO | WO-2000/18738 | A1 | 4/2000 |
| WO | WO-2000/21927 | A2 | 4/2000 |
| WO | WO-2000/41698 | A1 | 7/2000 |
| WO | WO-2000/042012 | A1 | 7/2000 |
| WO | WO-2000/43384 | A1 | 7/2000 |
| WO | WO-2000/055139 | A2 | 9/2000 |
| WO | WO-2000/59506 | A1 | 10/2000 |
| WO | WO-2000/071515 | A2 | 11/2000 |
| WO | WO-2001/12621 | A1 | 2/2001 |
| WO | WO-2001/14372 | A2 | 3/2001 |
| WO | WO-2001/74771 | A1 | 10/2001 |
| WO | WO-2001/96298 | A2 | 12/2001 |
| WO | WO-2002/00647 | A1 | 1/2002 |
| WO | WO-2002/14291 | A1 | 2/2002 |
| WO | WO-2002/014311 | A2 | 2/2002 |
| WO | WO-2002/026712 | A2 | 4/2002 |
| WO | WO-2002/28835 | A1 | 4/2002 |
| WO | WO-2002/34 727 | A2 | 5/2002 |
| WO | WO-2002/060869 | A2 | 8/2002 |
| WO | WO-2002/060876 | A1 | 8/2002 |
| WO | WO-2002/062763 | A2 | 8/2002 |
| WO | WO-2002/070662 | A2 | 9/2002 |
| WO | WO-2003/002114 | A2 | 1/2003 |
| WO | WO-2003/005999 | A2 | 1/2003 |
| WO | WO-2003/047579 | A1 | 6/2003 |
| WO | WO-2003/053368 | A2 | 7/2003 |
| WO | WO-2003/059373 | A2 | 7/2003 |
| WO | WO-2003/068223 | A1 | 8/2003 |
| WO | WO-2003/068229 | A1 | 8/2003 |
| WO | WO-2003/072577 | A1 | 9/2003 |
| WO | WO-2003/084539 | A2 | 10/2003 |
| WO | WO-2004/004720 | A1 | 1/2004 |
| WO | WO-2004/056783 | A1 | 7/2004 |
| WO | WO-2004/060305 | A2 | 7/2004 |
| WO | WO-2004/060306 | A2 | 7/2004 |
| WO | WO-2004/061084 | A2 | 7/2004 |
| WO | WO-2004/078128 | A2 | 9/2004 |
| WO | WO-2004/078746 | A2 | 9/2004 |
| WO | WO-2004/113352 | A1 | 12/2004 |
| WO | WO-2005/002673 | A1 | 1/2005 |
| WO | WO-2005/012254 | A1 | 2/2005 |
| WO | WO-2005/024755 | A2 | 3/2005 |
| WO | WO-2005/034869 | A2 | 4/2005 |
| WO | WO-2005/048948 | A2 | 6/2005 |
| WO | WO-2005/103011 | A1 | 11/2005 |
| WO | WO-2005/110994 | A2 | 11/2005 |
| WO | WO-2006/014290 | A2 | 2/2006 |
| WO | WO-2006/014325 | A2 | 2/2006 |
| WO | WO-2006/018662 | A2 | 2/2006 |
| WO | WO-2006/028958 | A2 | 3/2006 |
| WO | WO-2006/039718 | A2 | 4/2006 |
| WO | WO-2006/040056 | A1 | 4/2006 |
| WO | WO-2006/046552 | A1 | 5/2006 |
| WO | WO-2006/052936 | A2 | 5/2006 |
| WO | WO-2006/062984 | A2 | 6/2006 |
| WO | WO-2006/071940 | A2 | 7/2006 |
| WO | WO-2006/072589 | A2 | 7/2006 |

(56) References Cited

FOREIGN PATENT DOCUMENTS

| | | |
|---|---|---|
| WO | WO-2006/078610 A1 | 7/2006 |
| WO | WO-2006/081034 A2 | 8/2006 |
| WO | WO-2006/081335 A2 | 8/2006 |
| WO | WO-2006/099075 A2 | 9/2006 |
| WO | WO-2006/105844 A1 | 10/2006 |
| WO | WO-2007/008917 A2 | 1/2007 |
| WO | WO-2007/042321 A2 | 4/2007 |
| WO | WO-2007/064872 A2 | 6/2007 |
| WO | WO-2007/076473 A2 | 7/2007 |
| WO | WO-2007/081690 A2 | 7/2007 |
| WO | WO-2007/115670 A1 | 10/2007 |
| WO | WO-2007/125330 A1 | 11/2007 |
| WO | WO-2007/136465 A2 | 11/2007 |
| WO | WO-2007/137107 A2 | 11/2007 |
| WO | WO-2008/033858 A2 | 3/2008 |
| WO | WO-2008/033999 A2 | 3/2008 |
| WO | WO-2008/034008 A2 | 3/2008 |
| WO | WO-2008/046003 A2 | 4/2008 |
| WO | WO-2008/051757 A1 | 5/2008 |
| WO | WO-2008/131227 A1 | 10/2008 |
| WO | WO-2008/131253 A1 | 10/2008 |
| WO | WO-2008/140895 A1 | 11/2008 |
| WO | WO-2009/030887 A2 | 3/2009 |
| WO | WO-2009/076454 A2 | 6/2009 |
| WO | WO-2009/109035 A1 | 9/2009 |
| WO | WO-2009/126863 A2 | 10/2009 |
| WO | WO-2009/127822 A2 | 10/2009 |
| WO | WO-2009/138758 A2 | 11/2009 |
| WO | WO-2010/011837 A1 | 1/2010 |
| WO | WO-2010/051373 A1 | 5/2010 |
| WO | WO-2010/124283 A2 | 10/2010 |
| WO | WO-2010/135524 A1 | 11/2010 |
| WO | WO-2011/067306 A1 | 6/2011 |
| WO | WO-2011/123788 A1 | 10/2011 |
| WO | WO-2011/137342 A1 | 11/2011 |
| WO | WO-2011/139891 A1 | 11/2011 |
| WO | WO-2011/150198 A1 | 12/2011 |
| WO | WO-2012/008563 A1 | 1/2012 |
| WO | WO-2012/019015 A2 | 2/2012 |
| WO | WO-2012/035131 A1 | 3/2012 |
| WO | WO-2012/071519 A1 | 5/2012 |
| WO | WO-2012/097021 A1 | 7/2012 |
| WO | WO-2012/138783 A2 | 10/2012 |
| WO | WO-2013/036232 A2 | 3/2013 |
| WO | WO-2013/043569 A1 | 3/2013 |
| WO | WO-2013/066440 A1 | 5/2013 |
| WO | WO-2013/078295 A2 | 5/2013 |
| WO | WO-2013/134243 A1 | 9/2013 |
| WO | WO-2013/134252 A1 | 9/2013 |
| WO | WO-2013/134298 A1 | 9/2013 |
| WO | WO-2013/177420 A2 | 11/2013 |
| WO | WO-2013/184119 A1 | 12/2013 |
| WO | WO-2014/015056 A2 | 1/2014 |
| WO | WO-2014/032755 A2 | 3/2014 |
| WO | WO-2014/036387 A2 | 3/2014 |
| WO | WO-2014/037480 A1 | 3/2014 |
| WO | WO-2014/040242 A1 | 3/2014 |
| WO | WO-2014/040549 A1 | 3/2014 |
| WO | WO-2014/058317 A1 | 4/2014 |
| WO | WO-2014/102376 A1 | 7/2014 |
| WO | WO-2014/102377 A1 | 7/2014 |
| WO | WO-2014/139458 A1 | 9/2014 |
| WO | WO-2014/145004 A1 | 9/2014 |
| WO | WO-2014/145015 A2 | 9/2014 |
| WO | WO-2014/145023 A1 | 9/2014 |
| WO | WO-2014/145025 A2 | 9/2014 |
| WO | WO-2014/145028 A2 | 9/2014 |
| WO | WO-2014/145029 A2 | 9/2014 |
| WO | WO-2014/160183 A1 | 10/2014 |
| WO | WO-2014/182643 A2 | 11/2014 |
| WO | WO-2015/011399 A1 | 1/2015 |
| WO | WO-2015/051252 A1 | 4/2015 |
| WO | WO-2015/069217 A1 | 5/2015 |
| WO | WO-2015/069266 A1 | 5/2015 |
| WO | WO-2015/076213 A1 | 5/2015 |
| WO | WO-2015/092423 A1 | 6/2015 |
| WO | WO-2015/106292 A1 | 7/2015 |
| WO | WO-2015/106294 A1 | 7/2015 |
| WO | WO-2015/148620 A2 | 10/2015 |
| WO | WO-2015/184443 A1 | 12/2015 |
| WO | WO-2016/025621 A1 | 2/2016 |
| WO | WO-2016/061228 A1 | 4/2016 |
| WO | WO-2016/061231 A1 | 4/2016 |
| WO | WO-2016/096903 A1 | 6/2016 |
| WO | WO-2016/103223 A1 | 6/2016 |
| WO | WO-2016/111725 A1 | 7/2016 |
| WO | WO-2016/114322 A1 | 7/2016 |
| WO | WO-2016/135046 A1 | 9/2016 |
| WO | WO-2016/154524 A1 | 9/2016 |
| WO | WO-2016/196141 A1 | 12/2016 |
| WO | WO-2017/013160 A1 | 1/2017 |
| WO | WO-2017/033113 A1 | 3/2017 |
| WO | WO-2017/042944 A1 | 3/2017 |
| WO | WO-2017/079267 A1 | 5/2017 |
| WO | WO-2017/117182 A1 | 7/2017 |
| WO | WO-2017/146794 A1 | 8/2017 |
| WO | WO-2017/146795 A1 | 8/2017 |
| WO | WO-2017/214514 A1 | 12/2017 |
| WO | WO-2018/005737 A1 | 1/2018 |
| WO | WO-2018/052053 A1 | 3/2018 |
| WO | WO-2018/053189 A2 | 3/2018 |
| WO | WO-2018/106595 A1 | 6/2018 |
| WO | WO-2018195450 A1 | 10/2018 |
| WO | WO-2018/222173 A1 | 12/2018 |
| WO | WO-2018/222644 A1 | 12/2018 |
| WO | WO-2019/084462 A1 | 5/2019 |
| WO | WO-2019/152711 A1 | 8/2019 |
| WO | WO-2020/185812 A1 | 9/2020 |
| WO | WO-2021/030405 A1 | 2/2021 |
| WO | 2021138483 A1 | 7/2021 |

OTHER PUBLICATIONS

Gurunath, S.; et al. "Amorphous solid dispersion method for improving oral bioavailability of poorly water-soluble drugs" 2013, Journal of Pharmacy Research, vol. 6, pp. 476-480. (Year: 2013).*
International Search Report and Written Opinion of the International Searching Authority issued in corresponding application PCT/US2020/021957 dated Jul. 17, 2020 (16 pages).
U.S. Appl. No. 11/963,740, filed Dec. 21, 2007, Patented.
U.S. Appl. No. 11/870,388, filed Oct. 10, 2007, Patented.
U.S. Appl. No. 12/829,561, filed Jul. 2, 2010, Patented.
U.S. Appl. No. 11/854,354, filed Sep. 12, 2007, Patented.
U.S. Appl. No. 10/746,460, filed Dec. 24, 2003, Patented.
U.S. Appl. No. 10/886,329, filed Jul. 6, 2004, Patented.
U.S. Appl. No. 11/450,840, filed Jun. 9, 2006, Patented.
U.S. Appl. No. 11/336,708, filed Jan. 20, 2006, Patented.
U.S. Appl. No. 11/450,850, filed Jun. 9, 2006, Patented.
U.S. Appl. No. 10/746,607, filed Dec. 24, 2003, Patented.
U.S. Appl. No. 11/854,293, filed Sep. 12, 2007, Patented.
U.S. Appl. No. 12/105,408, filed Apr. 18, 2008, Patented.
U.S. Appl. No. 13/590,955, filed Aug. 21, 2012, Patented.
U.S. Appl. No. 11/450,849, filed Jun. 9, 2006, Patented.
U.S. Appl. No. 13/785,575, filed Mar. 5, 2013, Patented.
U.S. Appl. No. 12/608,578, filed Oct. 29, 2009, Patented.
U.S. Appl. No. 13/098,247, filed Apr. 29, 2011, Patented.
U.S. Appl. No. 13/559,170, filed Jul. 26, 2012, Patented.
U.S. Appl. No. 14/214,134, filed Mar. 14, 2014, Patented.
U.S. Appl. No. 14/383,803, filed Mar. 5, 2013, Patented.
U.S. Appl. No. 13/491,394, filed Jun. 7, 2012, Patented.
U.S. Appl. No. 13/801,753, filed Mar. 13, 2013, Patented.
U.S. Appl. No. 16/387,315, filed Apr. 17, 2019, Pending.
U.S. Appl. No. 14/214,127, filed Mar. 14, 2014, Patented.
U.S. Appl. No. 13/683,277, filed Nov. 21, 2012, Patented.
U.S. Appl. No. 14/549,125, filed Nov. 20, 2014, Patented.
U.S. Appl. No. 14/214,160, filed Mar. 14, 2014, Patented.
U.S. Appl. No. 14/214,171, filed Mar. 14, 2014, Patented.
U.S. Appl. No. 14/214,185, filed Mar. 14, 2014, Patented.
U.S. Appl. No. 14/214,179, filed Mar. 14, 2014, Patented.
U.S. Appl. No. 14/383,799, filed Mar. 5, 2013, Patented.

(56) References Cited

OTHER PUBLICATIONS

U.S. Appl. No. 14/535,900, filed Nov. 7, 2014, Patented.
U.S. Appl. No. 16/943,821, filed Jul. 30, 2020, Pending.
U.S. Appl. No. 16/943,871, filed Jul. 30, 2020, Pending.
U.S. Appl. No. 16/725,282, filed Dec. 23, 2019, Patented.
U.S. Appl. No. 16/870,384, filed May 8, 2020, Patented.
U.S. Appl. No. 16/870,418, filed May 8, 2020, Patented.
U.S. Appl. No. 16/902,989, filed Jun. 16, 2020, Patented.
U.S. Appl. No. 16/991,644, filed Aug. 12, 2020, Pending.
U.S. Appl. No. 17/028,640, filed Sep. 22, 2020, Pending.
U.S. Appl. No. 17/180,234, filed Feb. 19, 2021, Patented.
U.S. Appl. No. 17/180,241, filed Feb. 19, 2021, Patented.
U.S. Appl. No. 17/504,133, filed Oct. 18, 2021, Patented.
U.S. Appl. No. 18/314,348, filed May 9, 2023, Patented.
U.S. Appl. No. 17/358,137, filed Jun. 25, 2021, Patented.
U.S. Appl. No. 17/583,977, filed Jan. 25, 2022, Patented.
U.S. Appl. No. 17/583,985, filed Jan. 25, 2022, Patented.
U.S. Appl. No. 17/727,307, filed Apr. 22, 2022, Patented.
U.S. Appl. No. 17/735,820, filed May 3, 2022, Patented.
U.S. Appl. No. 18/148,766, filed Dec. 30, 2022, Patented.
U.S. Appl. No. 17/845,275, filed Jun. 21, 2022, Pending.
U.S. Appl. No. 17/845,278, filed Jun. 21, 2022, Pending.
U.S. Appl. No. 17/180,218, filed Feb. 19, 2021, Patented.
U.S. Appl. No. 17/869,108, filed Jul. 20, 2022, Patented.
U.S. Appl. No. 17/735,678 filed May 3, 2022, Patented.
U.S. Appl. No. 17/735,682 filed May 3, 2022, Patented.
U.S. Appl. No. 17/938,353 filed Oct. 6, 2022, Patented.
U.S. Appl. No. 17/735,862 filed May 3, 2022, Patented.
U.S. Appl. No. 18/091,743, filed Dec. 30, 2022, Patented.
U.S. Appl. No. 18/140,942, filed Apr. 28, 2023, Pending.
U.S. Appl. No. 17/833,272, filed Jun. 6, 2022, Patented.
U.S. Appl. No. 17/832,224, filed Jun. 3, 2022, Pending.
U.S. Appl. No. 18/078,269, filed Dec. 9, 2022, Pending.
U.S. Appl. No. 18/078,271, filed Dec. 9, 2022, Pending.
U.S. Appl. No. 18/073,721, filed Dec. 9, 2022, Pending.
U.S. Appl. No. 18/152,993, filed Jan. 11, 2023, Pending.
U.S. Appl. No. 18/464,519, filed Sep. 11, 2023, Pending.
U.S. Appl. No. 18/463,498, filed Sep. 8, 2023, Pending.
U.S. Appl. No. 18/490,188, filed Oct. 19, 2023, Patented.
U.S. Appl. No. 18/490,197, filed Oct. 19, 2023, Patented.
U.S. Appl. No. 18/512,447, filed Nov. 17, 2023, Pending.
U.S. Appl. No. 18/518,100, filed Nov. 22, 2023, Patented.
U.S. Appl. No. 18/518,110, filed Nov. 22, 2023, Patented.
U.S. Appl. No. 18/758,007, filed Jun. 28, 2024, Pending.
U.S. Appl. No. 18/795,711, filed Aug. 6, 2024, Pending.
U.S. Appl. No. 18/795,731, filed Aug. 6, 2024, Pending.
U.S. Appl. No. 18/795,683, filed Aug. 6, 2024, Pending.
U.S. Appl. No. 18/815,054, filed Aug. 26, 2024, Pending.
U.S. Appl. No. 18/971,846, filed Dec. 6, 2024, Pending.
U.S. Appl. No. 18/971,800, filed Dec. 6, 2024, Pending.
U.S. Appl. No. 18/980,378, filed Dec. 13, 2024, Pending.
U.S. Appl. No. 18/980,426, filed Dec. 13, 2024, Pending.
U.S. Appl. No. 18/985,885, filed Dec. 18, 2024, Pending.
U.S. Appl. No. 19/001,282, filed Dec. 24, 2024, Pending.
"A Safety, Tolerability and PK Study of DCC-2618 in Patients With Advanced Malignancies," ClinicalTrials.gov, Jan. 12, 2018, pp. 1-11. Retrieved from the Internet: URL: <https://clinicaltrials.gov/ct2/show/NC>.
"Additions and Corrections", Journal of Medicinal Chemistry, 32(12):2583 (1989).
"NHLBI LBC Computational Biophysics Scetion", CHARMM Documentation Index, http://www.lobos.nih.gov/Charmm/chmdoc.html, printed Mar. 4, 2005.
"Trilateral Project WM4 -Comparative Studies in New Technologies: Report on Comparative Study on Protein 3-Dimensional Structure Related Claims—Annex 3: Comments of the USPTO", Vienna, Austria, Nov. 4-8, pp. 58-79 (2002).
Advisory Action of U.S. Appl. No. 17/180,241 dated Jan. 7, 2022, 4 pages.

Aklilu, et al., "Increased PTHRP Production by a Tyrosine Kinase Oncogene, Tpr-Met: Rose of the Ras Signaling Pathway", The American Physiological Society, pp. E277-E283 (1996).
Albericio, et al., "Synthesis of a Sulfaydantion Library", J. Comb. Chem., 3:290-300 (2001).
Almerico, et al., "On the Preparation of 1-aryl-2-heteroaryl- and 2-aryl-1-heteroaryl-pyrroles as Useful Building Blocks for Biologically Interesting Heterocycles", ARKIVOC, Rudy Abramovitch Issue, pp. 129-142 (2001).
Antonescu, et al., "Acquired Resistance to Imatinib in Gastrointestinal Stromal Tumor Occurs Through Secondary Gene Mutation," Clinical cancer research : an official journal of the American Association for Cancer Research, 11(11):4182-4190 (2005).
Anzai, et al., "Alkyl- and Arylthiation of Uracil and Indole", J. Heterocyclic Chem., 16:567-569 (1979).
Askew, et al., "Molecular Recognition with Convergent Functional Groups: 6. Synthetic and Structural Studies with a Model Receptor for Nucleic Acid Components", J. Am. Chem., 111:1082-1090 (1989).
Assessment Report for Tukysa (tucatinib), European Medicines Agency, Dec. 10, 2020.
Avruch, J. et al., "Ras Activation of the Raf Kinase: Tyrosine Kinase Recmitment of the MAP Kinase Cascade," Recent Prag Harm. Res. (2001) 56: 127-155.
Bai et al., "Targeting the KITactivating switch control pocket: a novel mechanism to inhibit neoplastic mast cell proliferation and mast cell activation," Leukemia (2013), vol. 27, pp. 278-285.
Bais, et al., "Inhibition of Endogenous Wxalate Production: Biochemical Consideration of the Roles of Glycollate Oxidase and Lactate Dehydrogenase", Clinical Science, 76:303-309 (1989).
Baker, et al., "Irreversible Enzyme Inhibitors. 188. Inhibition of Mammalian Thymidine Phosphorylase", Journal of Medicinal Chemistry, 14:612-616 (1971).
Banks et al., Discovery and pharmacological characterization of AZD3229, a potent KIT/PDGFR inhibitor fortreatment of gastrointestinal stromal tumors, Sci. Transl. Med. 12, (2020).
Barker, et al., "Characterization of pp60c-src Tyrosine Kinase Activities Using a Continuous Assay: Autoactivation of the Enzyme is an Intermolecular Autophosphorylation Process", Biochemist , 35:14843-14851 (1995).
Barvian, et al., "Pyrido[2,3-d]pyrimidin-7-one Inhibitors of Cyclin-Dependent Kinases," J Med Chem. (2000) 43: 4606-4616.
Bausch, et al., "Proton-Transfer Chemistry of Urazoles and Related Imides, and Diacyl H drazides", J. Org. Chem., 56:5643-5651 (1991).
Beghini, et al., "C-kit mutations in core binding factor leukemias," Blood Journal, 95(2):726-727 (2000).
Benvenuti, et al., "Crystallization of Soluble Proteins in Vapor Diffusion for X-Ray Crystallography", Nature Protocols, 2(7):1633-1651 (2007).
Blay, et al., "Ripretinib in patients with advanced gastrointestinal stromal tumours (INVICTUS): a double-blind, randomised, placebo-controlled, phase 3 trial", Lancet Oncology, 21:923-934 (2020).
Bolton, et al., "Chapter 17. Ras Oncogene Directed Approaches in Cancer Chemotherapy," Ann. Rep. Med. Chem. (1994) 29: 165-174.
Bosca, et al., "Circular Dichroism Analysis of Ligand-Induced Conformational Changes in Protein Kinase C", Biochem. J., 290:827-832 (1993).
Boschelli, et al., "4-Anilino-3-quinolinecarbonitriles: An Emerging Class of Kinase Inhibitors", Current Topics in Medicinal Chemist, 2:1051-1063 (2002).
Bourdon Nec, et al., "Synthesis and Pharmacological Evaluation of New Pyrazolidine-3,5-diones as AT 1 Angiotensin II Receptor Antagonists", J. Med. Chem., 43:2685-2697 (2000).
Boyer, "Small Molecule Inhibitors of KDR (VEGFR-2) Kinase: An Overview of Structure Activit Relationships", Current Topics in Medicinal Chemist , 2:973-1000 (2002).
Brady, et al., "Fast Prediction and Visualization of Protein Binding Pockets with PASS". Journal of Computer-Aided Molecular Desi n, 14:383-401 (2000).
Branford, et al., "High Frequency of Point Mutations Clustered Within the Adenosine Triphosphate-binding Region of BCR/ABL in Patients With Chronic Myeloid Leukemia or Ph-positive Acute

(56) References Cited

OTHER PUBLICATIONS

Lymphoblastic Leukemia Who Develop Imatinib (ST1571) resistance," Blood (2002) vol. 99, pp. 3472-3475.
Brasher, et al., "C-Abul has High Intrinsic Tyrosine Kinase Activity that is Stimulated by Mutation of the Src Homology 3 Domain and by Autophosphorylation at Two Distinct Re ulator T rosines", Journal of Biolo ical Chemistr , 275:35631-35637 (2000).
Bullock, et al., "Prospects for Kinase Activity Modulators in the Treatment of Diabetes and Diabetic Complications", Current Topics in Medicinal Chemistr , 2:915-938 (2002).
Byron, et al., "The Synthesis of some Substituted Biphenyl-4-carboxylic Acids, 4-Biphenylylacetic Acids, and 4-Aminobiphenyls", J. Chem. Soc. (C), Organic, pp. 840-845 (1966).
Cardillo, et al., "Su lie 1,2-difenil-3.5-dichetopirazolidine", Gazz. Chim., Ital., 9:973-985 (1966).
Carr, J. B., et al., "Isoxazolc Anthelmintics," .J /'vied. Chem (1977) vol. 20, No. 7, pp. 934-939.
Chan et al., "Copper promoted C—N and C—O bond cross-coupling with phenyl and pyridylboronates, " Tetrahedron Letters (2003) vol. 44, pp. 3863-3865.
Chan, "Promotion of Reaction of N—H Bonds with Triarylbismuth and Cupric Acetate," Tetrahedron Letters (1996) vol. 37, No. 50, pp. 9013-9016.
Chan, et al., "New N- and O-Arylations with Phenylboronic Acids and Cupric Acetate," Tetrahedron Lett. (1998) 39: 2933-2936.
Chen, et al., "Biochemical Evidence for the Autophosphorylation and Transphosphorylation of Transforming Growth Factor 13 Receptor Kinases", Proc. Natl. Acad. Sci. USA, 92:1565-1569 (1995).
Cheng, et al., "Novel Solution Phase Strategy for the Synthesis of Chemical Libraries Containinq Small Organic Molecules", J. Am. Chem. Soc., 118:2567-2573 (1996).
Cheng, et al., "Synthesis and SAR of Heteroaryl-phenyl-substituted Pyrazole Derivatives as Highly Selective and Potent Canine COX-2 Inhibitors", Bioorganic & Medicinal Chemistry Letters, 16:2076-2080 (2006).
Chu, et al., "Using Affinity Capillary Electrophoresis to Determine Binding Stoichiometries of Protein-Ligand Interactions", Biochemistry, 33:10616-10621 (1994).
Cirillo, et al. "The Non-Diaryl Heterocycle Classes of p38 MAP Kinase Inhibitors", Current Topics in Medicinal Chemistry, 2:1021-1035 (2002).
Clinical trial NCT03353753 Phase 3 Study of DCC-2618 vs Placebo in Advanced GIST Patients Who Have Been Treated With Prior Anticancer Therapies (invictus)—clinicaltrials.gov—Nov. 27, 2017.
Clinical trial NCT02571036—A Safety, Tolerability and PK Study of DCC-2618 in Patients With Advanced Malignancies—clinicaltrials.gov—Dec. 16, 2015.
Clinical trial NCT02571036—A Safety, Tolerability and PK Study of DCC-2618 in Patients With Advanced Malignancies—clinicaltrials.gov—Feb. 10, 2016.
Clinical trial NCT02571036—A Safety, Tolerability and PK Study of DCC-2618 in Patients With Advanced Malignancies—clinicaltrials.gov—May 25, 2017.
Clinical trial NCT02571036—A Safety, Tolerability and PK Study of DCC-2618 in Patients With Advanced Malignancies—clinicaltrials.gov—Nov. 3, 2015.
Clinical trial NCT02571036—A Safety, Tolerability and PK Study of DCC-2618 in Patients With Advanced Malignancies—clinicaltrials.gov—Oct. 29, 2015.
Clinical trial NCT02571036—A Safety, Tolerability and PK Study of DCC-2618 in Patients With Advanced Malignancies—clinicaltrials.gov—Oct. 8, 2015.
Clinical trial NCT02571036—A Safety, Tolerability and PK Study of DCC-2618 in Patients With Advanced Malignancies—clinicaltrials.gov—Sep. 17, 2018.
Clinical trial NCT03353753 Phase 3 Study of DCC-2618 vs Placebo in Advanced GIST Patients Who Have Been Treated With Prior Anticancer Therapies (invictus)—clinicaltrials.gov—Nov. 21, 2018.

Closier, et al., "Nitrofuryl Heterocyclics. 1", Journal of Medicinal Chemistry, 13(4):638-640 (1970).
Cockerill, et al., "Small Molecule Inhibitors of the Class 1 Receptor Tyrosine Kinase Family", Current Topics in Medicinal Chemistry, 2:1001-1010 (2002).
Colton, et al., "Affinity Capillary Electrophoresis: A Physical-Organic Tool for Studying Interactions in Biomolecular Recognition", Electrophoresis, 19:367-382 (1998).
Corless, et al., "Biology of Gastrointestinal Stromal Tumors," Journal of Clinical Oncology, 22(18):3813-3825 (2004).
Cortes, et al., "Results of Imatinib Mesylate Therapy in Patients with Refractory or Recurrent Acute Myeloid Leukemia, High-Risk Myelodysplastic Syndrime, and Mveloproliferative Disorders", Cancer, 97(11):2760-2766 (2003).
Cortes, Javier, et al., "Eribulin Monotherapy Versus Treatment of Physician's Choice in Patients With Metastatic Breast Cancer (Embrace): A Phase 3 Open-label Randomised Study", The Lancet, vol. 377, No. 9769, Mar. 1, 2011 (Mar. 1, 2011), pp. 914-923, ISSN: 0140-6736, DOI: 10.1016/S0140-6736(11)60070-6.
Cross, et al., "Inhibition of Glycogen Synthase Kinase-3 by Insulin Mediated by Protein Kinase B", Nature, 378:785- 789 (1995).
Cudney, "Preface: Protein Crystallization and Dumb Luck", The Rigaku Journal, 16(1): 1-7 (1999).
Dajani, et al., "Crystal Structur of Glycogen Synthase Kinas 3j3: Structural Basis for Phosphate-Primed Substrate Specificity and Autoinhibition", Cell, 105:721-732 (2001).
Dajani, et al., "Structural Basis for Recruitment of Glycogen Synthase Kinase 313 to the Axin-APC Scaffold Complex", EMBO, 22(3):494-501 (2003).
Daley, et al., "Induction of Chronic Myelogenous Leukemia in Mice by the P21 otcriat, Gene of the Philadelphia Chromosome," Science (Feb. 16, 1990) vol. 247, pp. 824-830.
Database Registry [Online] Chemical Abstracts Service, Columbus, Ohio, US; May 27, 2010, XP002777425, retrieved from STN accession No. 1225278-16-9 RN (2 pages).
Davies, H. et al., "Mutations of the BRAF gene in human cancer," Nature (Jun. 2002) 41 7: 949-954.
Davis, et al., "Iterative Size-Exclusion Chromatography Coupled with Liquid Chromatographic Mass Spectrometry to Enrich and Identify Tight-Binding Ligands from Complex Mixtures", Tetrahedron, 55:11653-11667 (1999).
De Boer, et al., "Synthesis and Characterization of Conjugated Mono- and Dithiol Oligomers and Characterization of Their Self-Assembled Monolayers", Langmuir, 19:4272-4284 (2003).
De Palma et al., "Angiopoietin-2 TIEs Up Macrophages in Tumor Angiogenesis" Clin Cancer Res; 17(16) Aug. 15, 2011.
De Silva, et al., "Gastrointestinal Stromal Tumors (GIST): C-kin Mutations, CD117 Expression, Differential Diagnosis and Targeted Cancer Therapy with Imatinib", Pathology Oncology Research, 9(1):13-19 (2003).
Debiec-Rychter, et al., "Mechanisms of Resistance to Imatinib Mesylate in Gastrointestinal Stromal Tumors and Activity of the PKC412 Inhibitor Against Imatinib-Resistant Mutants," Gastroenterology, 128(2):270-279 (2005).
Deciphera Pharmaceuticals LLC, "DCC-2618, a small molecule inhibitor of normal and mutant KIT kinase for treatment of refractory gastrointestinal stromal tumors (GIST)" (Presented on Sep. 24, 2011 at GIST Summit 2011 on "Gastrointestinal stromal tumors.").
Deciphera Pharmaceuticals LLC, "Deciphera Pharmaceuticals announces positive top-line results from INVICTUS pivotal phase 3 clinical study of Ripretinib in patients with advanced gastrointestinal stromal tumors", 1-3 (2019).
Deciphera Pharmaceuticals LLC, "Deciphera Pharmaceuticals Initiates Pivotal Phase 3 Clinical Study of Ripretinib (DCC-2618) in Second-line Patients with Gastrointestinal Stromal Tumors ("Intrigue" Study)", 1-2 (2018).
Deciphera Pharmaceuticals LLC, "Qinlock Full Prescribing Information", 1-18 (2020).
Deciphera Pharmaceuticals: "Highlights of Prescribing Information These highlights do not include all the information needed to use Qinlock safely and effectively. See full prescribing information for

(56) References Cited

OTHER PUBLICATIONS

"Qinlock," (May 1, 2020), retrieved from internet: https://www.accessdata.fda.gov/drugsatfda_docs/label/2020/213973s000lbl.pdf, 18 pages.
Deng, et al., "Expression, Characterization, and Crystallization of the Pyrophosphate-Dependent Phosphofructo-1-Kinase of Borrelia Burgdorferi", Archives of Biochemistry and Biophvsics, 371(2):326-331 (1999).
Dess, et al., "A Useful 12-1-5 Triacetoxyperiodiane (the Dess-Martin Periodiane) for Selective Oxidation of Primary or Secondary Alcohols and a Variety of Related 12-1-5 Species", J. Am. Chem., Soc., 113:7277-7287 (1991).
Dong, J., Overcoming Resistance To BRAF And MEK inhibitors By Simultaneous Suppression Of CDK4. InTech. Jan. 30, 2013. Melanoma—From Early Detection to Treatment, Chapter 1; abstract; p. 7, second paragraph; p. 9, figure 4; DOI: 10.5772/53620.
Dumas, "Preface", Current Topics in Medicinal Chemistry (2002).
Dumas, "Protein Kinase Inhibitors: Emerging Pharmacophores", Exp. Opin. Ther. Patent, 11 :405-429 (2001).
Dumas, et al., "Discovery of a New Class of p38 Kinase Inhibitors", Bioorganic & Medicinal Chemistry Letters, 10:204 7-2050 (2000).
Dumas, et al., "Recent Developments in the Discovery of Protein Kinase Inhibitors From the Urea Ciass," Current Opinion in Drug Discovery & Development (2004) vol. 7, No. 5, pp. 600-616.
Ettmayer, et al., "Lessons Learned from Marketed and Investigational Prodrugs," Journal of Medicinal Chemistry (May 6, 2004) vol. 47, No. 10, pp. 2393-2404.
European Patent Application No. 20845854.7, Communication of notices of opposition (R. 79(1) EPC) dated Aug. 16, 2024.
European Patent Application No. 20845854.7, Opposition brief and citations, dated Aug. 1, 2024.
Ewing, "Critical Evaluation of Search Algorithms for Automated Molecular Docking and Database Screeninq", Journal of Computational Chemistry, 18(9):1175-1189 (1997).
Examination Report in Indian Patent App. No. 11241/DELNP/2014 mailed Apr. 1, 2019.
Faderl et al., "The Biology of Chronic Myeloid Leukemia," The New England Journal of Medicine (Jul. 15. 1999) vol. 341. No. 3. pp. 164-172.
Farooqui, et al., "Interactions Between Neural Membrane Glycerophospholipid and Sphingolipid Mediators: A Recipe for Neural Cell Survival or Suicide", Journal of Neuroscience Research, 85:1834-1850 (2007).
Fathalla, "Synthesis of New Pyrazolo[1,5-a]pyrimidine Derivative Using 5-Aminouracil and Ketene Dithiacetal", Arch Pharm Res, 22(6):571-574 (1999).
Fathalla, et al., "Synthesis of New Uracil-5-Sulfonamide Derivatives and Immuno-Stimulatory Effect of a Chemically Modified Hemolymph of Biomphalaria Alexandrina on Schistosoma Manosi Infected Mice", Arch Pharm Res., 26(5):358-366 (2003).
Fathalla, et al., "Synthesis of New Uracil-5-Sulphonamide-p-Phenyl Derivatives and Their Effect on Biomphalaria alexandrina Snail's Nucleoproteins", Arch. Pharm. Res., 23(2): 128-138 (2000).
Flatt, et al., "Synthesis of Thiol Substituted Oligoanilines for Molecular Device Candidates", Tetrahedron Letters, 44:6699-6702 (2003).
Fletcher, et al., "Diagnosis of Gastrointestinal Stromal Tumors: A Consensus Approach", 33(5):459-465 (2002).
Fletcher, et al., "KIT Mutations in GIS, Current Opinion in Genetics & Development," Science Direct, p. 3-7 (2007).
Frame, et al., "A Common Phosphate Binding Site Explains the Unique Substrate Specificity of GSK3 and Its Inactivation by Phosphorylation", Molecular Cell, 7:1321-1327 (2001).
Furyua, et al., "Addition of 4-Ethoxyimidazoles to Dimethyl Acetylenedicarboxylate and Transformation of the Adducts to Pyrimidian-5-yl Acetates", Chem. Pharm. Bull., 36(5):1669- 1675 (1988).
Gajiwala, et al., "KIT kinase mutants show unique mechanisms of drug resistance to imatinib and sunitinib in gastrointestinal stromal tumor patients," Proceedings of the National Academy of Sciences of the USA 106(5):1542-1547 (2009).

Garcia-Tellado, et al., "Molecular Recognition in the Solid Waste State: Controlled Assembly of Hydrogen-Bonded Molecular Sheets", J. Am. Chem. Soc., 113:9265-9269 (1991).
George, et al., "Initial Results of Phase 1 Study of DCC-2618, a Broad-Spectrum Kit and PDGFRA Inhibitor, in Patients (PTS) with Gastrointestinal Stromal Tumor (GIST) by Number of Prior Regimes", European Society for Medical Oncology, 1-13 (2018).
Gishizky, et al., "Efficient transplantation of BCR-ABL-induced Chronic Myelogenous Leukemia-like Syndrome in Mice," Proc. Natl. Acad. Sci. (Apr. 1993) vol. 90, pp. 3755-3759.
Gorre et al., "Clinical Resistance to STI-571Cancer Therapy Caused by BCR-ABL Gene Mutation or Amplification," Science (Aug. 3, 2001) vol. 293, pp. 876-880.
Greene, et al., "Chapter 7: Protection for the Amino Group", in Protective Groups in Organic Synthesis, Third Edition, pp. 494-653 (1999).
Griffith, et al., "TPAP: Tetra-n-propylammonium Perruthenate, A Mild and Convenient Oxidant for Alcohols", Aldrichimica Acta, 23(1):13-19 (1990).
Guzel, "Investigation of the Relationship Between the Inhibitory Activity of Glycolic Acid Oxidase (GAO) and its Chemical Structure: Electron-Topological Approach", Journal of Molecular Structure, 366:131-137 (1996).
Haar, et al., "Structure of GSK313 Reveals a Primed Phosphorylation Mechanism", Nature Structural Bioloav, 8(7):593-596 (2001).
Hackler, et al., "The Syntheses of 5-Amino-3- t-butylisothiazole and 3-Amino-5-t-butylisothiazole," J. Heterocyclic Chem. (Nov.-Dec. 1989) vol. 26, pp. 1575-1578.
Haesslein, et al., "Recent Advances in Cyclin-Dependent Kinase Inhibition. Purine-Based Derivatives as Anti-Cancer Agents. Roles and Perspectives for the Future", Current Topics in Medicinal Chemistry, 2:1037-1050 (2002).
Hearing Notice in Indian Patent App. No. 11241/DELNP/2014 mailed Jan. 24, 2020.
Heegaard, et al., "Affinity Capillary Electrophoresis: Important Application Areas and Some Recent Developments", Journal ofChromatoqraphy B, 715:29-54 (1998).
Heinrich, et al., "Molecular Correlates of Imatinib Resistance in Gastrointestinal Stromal Tumors," Journal of Clinical Oncology, 24(29):4764-4774 (2006).
Heinrich, et al., "Primary and Secondary Kinase Genotypes Correlate With the Biological and Clinical Activity of Sunitinib in Imatinib-Resistant Gastrointestinal Stromal Tumor," Journal of Clinical Oncology, 26(33):5352-5359 (2008).
Honda, et al., "Determination of the Association Constant of Monovalent Mode Protein-Sugar Interaction by Capillary Zone Electrophoresis", Journal of Chromatography, 597:377-382 (1992).
Hu, et al., "Capillary Electrophoresis for the Analysis of Biopolymers", Anal., Chem., 74:2833-2850 (2002).
Huang, et al., "Inhibition of Nucleoside Transport by Protein Kinase Inhibitors", The Journal of Pharmacolo and Experimental Therapeutics, 304 2 :753-760 (2003).
Hubbard, "Crystal Structure of the Activated Insulin Receptor Tyrosine Kinase in Complex with Peptide Substrate and ATP Analo ", EMBO, 16(18):5573-5581 (1997).
Hubbard, et al., "Crystal Structure of the Tyrosine Kinase Domain of the Human Insulin Receptor", Nature, 374:746-754 (1994).
Hughes, et al., "Modulation of the Glycogen Synthase Kinase-3 Family by Tyrosine Phosphorlation", EMBO, 12 2 :803-808 (1993).
Huse et al., "The Conformational Plasticity of Protein Kinases," Cell (May 3, 2002) vol. 109, pp. 275-282.
Huse, et al., "Crystal Structure of the Cytoplasmic Domain of the Type I TGFI3 Receptor in Complex with FKBP12", Cell, 96:425-436 (1999).
Huse, et al., "The TGFI3 Receptor Activation Process: An Inhibitor-to Substrate-Binding Switch", Molecular Cell, 8:671-682 (2001).
Igarashi, et al., "Antimicrobial Activities of 2-arylthio-N-alkylmaleimides", Journal of Industrial Microbiolo, 9:91-96 (1992).
International Human Genome Sequencing Consortium, "Initial Sequencing and Analysis of the Human Genome", Nature, 409:860-921 (2001).
International Preliminary Report on Patentability of PCT/US2022/028456 dated Nov. 23, 2023, 10 pages.

(56) References Cited

OTHER PUBLICATIONS

International Search Report and Written Opinion from PCT/US2012/041378, mailed Sep. 17, 2012.
International Search Report and Written Opinion from PCT/US2017/035005, mailed Feb. 22, 2018.
International Search Report and Written Opinion from PCT/US2019/016148, mailed Apr. 17, 2019.
International Search Report and Written Opinion from PCT/US2019/016161, mailed Apr. 23, 2019.
International Search Report and Written Opinion from PCT/US2020/045876, mailed Oct. 22, 2020.
International Search Report and Written Opinion from PCT/US2020/067557, mailed Apr. 23, 2021.
International Search Report and Written Opinion from PCT/US2020/067560, mailed Apr. 23, 2021.
International Search Report and Written Opinion from WO2008/034008 A3, mailed Apr. 11, 2008.
International Search Report issued for PCT/US2008/060833, mailed Sep. 30, 2008.
International Search Report issued for PCT/US2008/060867, mailed Sep. 29, 2008.
International Search Report issued for PCT/US2008/060896, mailed Sep. 29, 2008.
Ishida, et al., "Molecular Arrangement and Electrical Conduction of Self-Assembled Monola ers Made from Terphen I Thiols", Surface Sciences, 514:187-193 (2002).
Islip, et al., "Nitrofuryl Heterocyclics 3", Journal of Medicinal Chemistry, 16(11): 1309-1310 (1973).
Jackson, et al., "N-Terminal Mutations Activate the Leukemogenic Potential of the M risto lated form of c-abl", EMBO, 8(2):449-456 (1989).
Jackson, et al., "Pyridinylimidazole Based p38 MAP Kinase Inhibitors", Current Topics in Medicinal Chemist, 2:1011-1020 (2002).
Janku F. et al., "DCC-2618, a pan KIT and PDGFR switch control inhibitor, achieves proof-of-concept in a first-in-human study," Late Breaking Abstracts, Plenary Session 6, Dec. 1, 2016, p. s4.
Janku Filip et al., "Pharmacokinetic-driven phase I study of DCC-2618 a pan-KIT and PDGFR inhibitor in patients (pts) with gastrointestinal stromal tumor (GIST) and other solid tumors," J. Clin. Oncol. (2017) No. 15, Suppl 2515.
Janku, et al., "Abstract CT058: Ripretinib (DCC-2618) pharmacokinetics (PK) in a Phase I study in patients with gastrointestinal stromal tumors (GIST) and other advanced malignancies: A retrospective evaluation of the PK effects of proton pump inhibitors (PPIs)", American Association for Cancer Research, 79(13): 1-4 (2019).
Janku, F. et al., "Phase 1 study of ripretinib, a broad-spectrum KIT and PDGFRA inhibitor, in patients with KIT-mutated or KIT-amplified melanoma," ESMO Congress Virtual Meeting, (Sep. 16, 2021), p. 1.
Janku, F. et al., "Phase I study of ripretinib, a broad-spectrum KIT and PDGFRA inhibitor, in patients with KIT-mutated or KIT-amplified melanoma," Annals of Oncology, vol. 32, (Sep. 1, 2021), p. S896.
Janku, F. et al., "Ripretinib Demonstrates Impressive Efficacy, Durability in Heavily Pretreated KIT-Mutated Melanoma," (Dec. 6, 2021), retrieved from https://www.onclive.com/view/ripretinib-demonstrates-impressive-efficacy-durability-in-heavily-pretreated-kit-mutated-melanoma, access on Feb. 5, 2024.
Jiang, et al., ""Soft Docking": Matching of Molecular Surface Cubes", J. Mol. Biol., 219:79- 102 (1991).
Jiang, et al., "Synthesis and SAR Investigations for Novel Melanin-Concentrating Hormone 1 Receptor (MCH1) Antagonists Part 1. The Discovery of Arylacetamides as Viable Replacements for the Dihydropyrimidione Moiety of an HTS Hit", J. Med. Chem., 50:3870- 3882 (2007).
Johnson, "Circular Dichroism Spectroscopy and The Vacuum Ultraviolet Region", Ann. Rev. Phys. Chem., 29:93-114 (1978).
Johnson, "Protein Secondary Structure and Circular Dichroism: A Practical Guide", Proteins: Structure, Function, and Genetics, 7:205-214 (1990).
Johnson, et al., "An Evaluation of the Effect of Light Stabilisers on the Exterior Durability of Polyester Powder Coatings for the Architectural Market", Surface Coatings International, 3:134-141 (1999).
Johnson, et al., "The Stereochemistry of Oxidation at Sulfur Oxidation of 2-Thiabicyclo[2.2.1]Hpetane", Tetrahedron, 25:5649-5653 (1969).
Kalinsky, K. et al., "A Phase II Trial of Dasatinib in Patients with Locally Advanced or Stage IV Mucosal, Acral and Vulvovaginal Melanoma: A Trial of the ECOG-ACRIN Cancer Research Group (E2607)," American Cancer Society, vol. 123, No. 14, (Mar. 23, 2017), pp. 2688-2697.
Katritzky, et al., "Novel Chromophoric Heterocycles Based on Maleimide and Naphthoquinone", J. Heterocyclic Chem., 26:885-892 (1989).
Kern, et al., "Synthese von Makromolekeln einheitlicher Brol3e. II Mitt: Syntheses neuer Diololigo-urethane nach dem Duplikationsverfahren", Makromolekulara Chemie, 16:89-107 (1955).
Kettle et al., "Discovery of N-(4-{[5-Fluoro-7-(2-methoxyethoxy)quinazolin-4-yl]amino}phenyl)-2-[4-(propan-2-yl)-1H-1,2,3-triazol-1-yl]acetamide (AZD3229), a Potent Pan-KIT Mutant Inhibitor for the Treatment of Gastrointestinal Stromal Tumors" Journal of Medicinal Chemistry (2018), 61(19), 8797-8810.
Kim, et al., "Solid Phase Synthesis of Benzamidine and Butylamine-Derived Hydantoin Libraries", Molecular Diversitv, 3:129-132 (1998).
Klayman, et al., "The Reaction of S-Methiodide Derivatives of Activated Thioureas with Hydroxylic Compounds. A Novel Synthesis of Mercaptans", J. Org. Chem., 37(10):1532-1537 (1972).
Kleywegt, et al., "Detection, Delineation, Measurement and Display of Cavities in Macromolecular Structures", Acta Cryst, D50:178-185 (1994).
Koch, et al., "QSAR and Molecular Modelling for a Series of Isomeric X-Sulfanilamido-1-phenylpyrazoles", Quant. Struct. Act. Relat., 12:373-382 (1993).
Kolch, W., "Meaningful relationships: the regulation of the Ras/Raf/MEKJERK pathway by protein interactions," Biochern. J (2000) 351: 289-305.
Komatsu, Y. et al., "Decipher the New Clinical Practice Guideline for GIST," transcript of a roundtable talk sponsored by Bayer Yakuhin, Ltd., (2014) and english translation included.
Konno, et al., "Effect of polymer type on the dissolution profile of amorphous solid dispersions containing felodipine", European Journal of Pharmaceutics and Biopharmaceutics, vol. 70, Issue 2, 493-499 (2008).
Konopka, et al., "Cell Lines and Clinical Isolates Derived From Ph-positive Chronic Myelogenous Leukemia Patients Express c-abl Proteins With A Common Structural Alteration," Proc. Natl. Acad. Sci. (Mar. 1985) vol. 82, pp. 1810-1814.
Krasovitskii, et al., "Synthesis and Spectral-Luminescence Properties of Hetarylethylene Derivatives of 2,5-Diphenyloxazole and 2,5-Diphenyl-1,3,4-Oxadiazole", Khimiya Geterotsiklicheskikh Soedinenii, 5:617-621 (1982).
Kuhn, et al., "The Genesis of High-Throughput Structure-Based Drug Discovery using Protein Crystallography", Analytical Techniques, Current Opinion in Chemical Biology, 6:704-710 (2002).
Kumar, et al., "P38 Map Kinases: Key Signalling Molecules as Therapeutic Targets for Inflammatory Diseases", Nature Reviews Drug Discovery, 2:717-726 (2003).
Kundrot, "Which Strategy for a Protein Crystallization Project", CMLS, Cell. Mol. Life Sci., 61 :525-536 (2004).
Kundu, et al., "Depropargylation Under Palladium-Copper Catatlysis: Synthesis of Diaryl Sulfides", Tetrahedron, 57:5885-5895 (2001).
Kurogi, et al., "Discovery of Novel Mesangial Cell Proliferation Inhibitors Using a Three-Dimensional Database Searching Method", J. Med. Chem., 44:2304-2307 (2001).
Kuse, et al., Synthesis of azide-fluoro-dehydrocoelentcrazine analog as a photoaffinitylabeling probe and photolysis of azide-fluoro-coelenterazine;' Tetrahedron Lett. (2005) 61: 5754-5762.
Kwong, et al., "A General, Efficient, and Inexpensive Catalyst System for the Coupling Aryl Iodides and Thiols", Organic Letters, 4(20):3517-3520 (2002).
Laskowski, "Surfnet: A Program for Visualizing Molecular Surfaces, Cavities, and Intermolecular Interactions", Journal of Molecular Graphics, 13:323-330 (1995).

(56) References Cited

OTHER PUBLICATIONS

Leca, et al., "A New Practical One-Pot Access to Sulfonimidates", Organic Letters, 4(23):4093-4095 (2002).
Lefevre, et al., "Roles of Stem Cell Factor/c-Kit and Effects of Glivec®/STI571 in Human Uveal Melanoma Cell Turmorigenesis", Journal of Biological Chemistry, 279(30):31769-31779 (2004).
Lesort, et al., "Insulin Transiently Increases Tau Phosphorylation: Involvement of Glycogen Synthase Kinase-3f3 and Fyn Tyrosine Kinase", Journal of Neurochemistry, 72(2):576-584 (1999).
Leung, et al., "The Difluoromethylensulfonic Acid Groups as a Monoanionic Phosphate Surrogate for Obtaining PTP1 B Inhibitors", Bioorganic & Medicinal Chemistry, 10:2309-2323 (2002).
Li, et al., "Targeting Serine/Threonine Protein Kinase B/Akt and Cell-cycle Checkpoint Kinases for Treating Cancer", Current Topics in Medicinal Chemistry, 2:939-971 (2002).
Li, et al., "The P190, {210, and P230 Forms of the BCR/ABL Oncogene Induce a Similar Chronic Myeloid Leukemia-like Syndrome in Mice but Have Different Lymphoid Leukemogenic Activity", J. Exp. Med., 189(9):1399-1412 (1999).
Li, X. et al., "Effect of hepatic impairment on the pharmacokinetics of ripretinib," Journal of Clinical Oncology, V. 40, No. 16, suppl., e16031, (2022), 1 page.
Lim et al., "Current research and treatment for gastrointestinal stromal tumors" World Journal of Gastroenterology (2017), 23(27), 4856-4866 Publisher: Baishideng Publishing Group Inc.
Link, et al., "Synthesis of 8-Substituted 5-Deazaflavins", J. Heterocyclic Chem, 22:841-848 (1985).
Lipinski, et al., "Experimental and Computational Approaches to Estimate Solubility and Permeability in Drug Discovery and Development Settings", Advanced Drug Delivery Reviews, 23:3-25 (1997).
Longley et al., "Somatic c-KIT activating mutation in urticaria pigmentosa and aggressive mastocytosis: establishment of clonality in a human mast cell neoplasm," Nature Genetics, 12(3):312-314 (1996).
Loren, et al., "NH-1,2,3-Triazoles from Azidomethyl Pivalate and Carbamates: Base-Labile N-Protecting Groups", Synlett, 18:2847-2850 (2005).
Lorenzi, et al., "Amino Acid Ester Prodrugs of 2-Bromo-5, 6-dichloro-1-([3-D-ribofuranosyl)benzimidazole Enhance Metabolic Stability In Vitro and In Vivo," The Journal of Phannaco/ogy and Experimental Therapeutics (2005) vol. 314, No. 2 pp. 883-890.
Lowinger, et al., "Design and Discovery of Small Molecules Targeting Raf-1 Kinase", Current Pharmaceutical Design, 8:2269-2278 (2002).
Lu Jiade et al., "Advanced in the targeted therapy of cancer: multi targeted Raf kinase inhibitor," China Oncology, vol. 17, No. 1, (Dec. 31, 2007), pp. 1-7.
Ma, et al., "c-MET Mutational Analysis in Small Cell Lung Cancer: Novel Juxtamembrane Domain Mutations Regulating Cytoskeletal Functions", Cancer Research, 63:6272-6281 (2003).
Ma, et al., "c-Met: Structure, Functions and Potential for Therapeutic Inhibition", Cancer and Metastasis Reviews, 22:309-325 (2003).
Magnuson, et al., "The Raf-I serine/threonine protein kinase," Seminars in Cancer Biology. (1994) 5: 247-253.
Mallakpour, et al., "Uncatalyzed Polymerization of Bistriazolinediones with Electron-Rich Aromatic Compounds via Electrophilic Aromatic Substitution", Journal of Polymer Science: Part A: Polymer Chemistry, 27:217-235 (1989).
Mamaev, et al., "Synthesis of 2,5'-Bipyrimidines from Substituted 5-Cyanopyrimidines", Khimiya Geterotsiklicheskikh Soedinenni, 24(3):371-375- (1988).
March, et al., "Tautomerism", from March's Advanced Organic Chemisto.:: , 4th Edition, WileyInterscience, pp. 69-74.
March's Advanced Organic Chemisto.:::: Reactions Mechanisms and Structure Fifth Edition, Smith and March Editors, Wiley-Interscience Publication (2001).
Martinez, et al., "First Non-ATP Competitive Glycogen Synthase Kinase 313 (GSK-313) Inhibitors: Thiadizolidinones (TDZD) as Potential Drugs for the Treatment of Alzheimers Disease", J. Med. Chem., 45(2002)1292-1299 (2002).
Mattsson, et al., "Six X-Linked Agammaglobulinemia-Causing Missense Mutations in the Src Homology 2 Domain of Bruton's Tyrosine Kinase: Phosphotyrosine-Binding and Circular Dichroism Analysis", Journal of Immuloloav, pp. 4170-4177 (2000).
Mazzieri, R et al., Targeting The ANG2/TIE2 Axis Inhibits Tumor Growth And Metastasis By impairing Angiogenesis And Disabling Rebounds Of Proangiogenic Myelid Cells. Cell. Apr. 12, 2001, vol. 19, pp. 512-526; DOI: 10.1016/j.ccr.2001.02.005.
McPherson, "Current Approaches to Macromolecular Crystallization", Eur. J. Biochem., 189:1-23 (1990).
Medebielle, et al., "A Convenient Synthesis of Perfluoroalkylated and Fluorinated-Aryl Nitrogen Bases by Electrochemically Induced SRN1 Substitution", J. Org. Chem., 61:1331- 1340 (1996).
Medebielle, et al., "A New Convenient Synthesis of 5-Aryl Uracils Using SRN1 Aromatic Nucleophilic Substitution", Tetrahedron Letters, 34(21 ):3409-3412 (1993).
Mikhaleva, et al., "Relative Reactivities of the Chlorine Atoms of 2,2',4-Trichloro-4',5-Dipyrimidinyl in its Reaction with Piperidine", Khimiya Geterotsiklicheskikh Soedinenii, 6:821-826 (1979).
Miller, et al., "A Win-Win Solution in Oral Delivery of Lipophilic Drugs: Supersaturation via Amorphous Solid Dispersions Increases Apparent Solubility without Sacrifice of Intestinal Membrane Permeability", Molecular Pharmaceutics, vol. 9, Issue 7, 2009-2016 (2012).
Miller, et al., "Spray-Drying Technology", Formulating Poorly Water Soluble Drugs, 363-442 (2012).
Mol, "Structural Basis for the Autoinhibition and STI-571 Inhibition of c-Kit Tyrosine Kinase," The Journal Of Biological Chemistry, 279(30):31655-31663 (2004).
Morris, et al., "Automated Docking of Flexible Ligands to Macromolecules", AutoDock Website, www.scripps.edu/mb/olson/doc/autodock/, printed March 3, (2005).
Morris, et al., "Automated Docking Using a Lamarckian Genetic Algorithm and an Empirical Binding Free Energy Function", Journal of Computational Chemistry, 19(14): 1639-1662 (1998).
Morstyn, et al., "Stem Cell Factor Is a Potent Synergistic Factor in Hematopoiesis", Oncology, 51:205-214 (1994).
Moss, et al., 'Basic Terminology of Stereochemistry, Pure & Appl. Chem., 6812):2193-2222 (1996).
Muller, "Glossary of Terms Used in Physical Organic Chemistry", Pure & Appl. Chem., 66(5):1077-1184 (1994).
Muller, et al., "A General Synthesis of 4-Substituted 1, 1-Dioxo-1,2,5-thiadiazolidin-3-ones Derived from a-Amino Acids", J. Org. Chem., 54:4471-473 (1989).
Murayama, et al., "JNK (c-Jun NH2 Terminal Kinase) and p38 During Ischemia Reperfusion Injury in the Small Intestine" Transplantation, 81(9):1325-1330 (2006).
Mutlib, et al., "Disposition of 1-[3-(Aminomethyl)phenyl]-N-[3-fluoro-2'-(methylsulfonyl)-[1, 1 '-biphenyl]-4-yl]-3(trifluomethyl)-1 H-pyrazole-5-carboxamide (DPC 423) by Novel Metabolic Pathways. Characterization of Unusual Metabolites by Liquid Chromatography/Mass Spectrometrv and NMR", Chem. Res. Toxicol., 15:48-62 (2002).
Mutlib, et al., "P450-Mediated Metabolism of 1-[3-(Aminomethyl)phenyl]-N-[3-fluoro-2'-(methylsulfonyl)-[1, 1 '-biphenyl]-4-yl]-3(trifluomethyl)-1 H-pyrazole-5-carboxamide (DCP 423) and Its Analogues to Aldoximes. Characterization of Glutathione Conjugates of Postulated Intermediates Derived from Aloximes", Chem. Res. Toxicol., 15:63-75 (2002).
Nagano, M. et al. "Studies on Organic Sulfur Compounds. XIV. The Reaction of N-alkoxy-carbonyl-N'-(2-thiazolyl)thioureas with some oxidants." Chemical and Pharmaceutical Bulletin. vol. 21, No. 11, pp. 2408-2416. ISSN: 0009-2363. Nov. 1973.
Nagar, et al., "Crystal Structures of the Kinase Domain of c-Abl in Complex with the Small Molecule Inhibitors PD173955 and Imatinib (STI-571)", Cancer Research, 62:4236-4243 (2002).
Nagata, et al., "Identification of a point mutation in the catalytic domain of the protooncogene c-kit in peripheral blood mononuclear cells of patients who have mastocytosis with an associated hematologic disorder," Proc. Natl. Acad. Sci. USA, 92(23):10560-10564 (1995).

(56) References Cited

OTHER PUBLICATIONS

Nager, et al., "Structural Basis for the Autoinhibition of c-Abl Tyrosine Kinase," Cell (Mar. 21, 2003) vol. 112, pp. 859-871.
Nakopoulou, et al., "c-Met Tyrosine Kinase Receptor Expression is Associated with Abnormal !3-catenin Expression and Favourable Prognostic Factors in Invasive Breast Carcinoma", Histopholoav, 36:313-325 (2000).
Nantaka-Namirski, et al., "Condensation Reaction of Ethyl (4-Uracil)-Acetate with Ethyl Orthoformate", ACTA Polon. Pharm XXVII, 28(5):455-463 (1971).
National Academy of Sciences, "Abstracts of Papers Presented at the Autumn Meeting, Nov. 14-16, 1960", Science, 132:1488-1501 (1960).
Nemunaitis, et al., "Intrigue: Phase III study of ripretinib versus sunitinib in advanced gastrointestinal stromal tumor after imatinib", Future Oncol., 16(1), 4251-4264 (2020).
Nicolaou, et al., "Molecular Design and Chemical Synthesis of a Highly Potent Epothilone", ChemMedChem, 1:41-44 (2006).
Nikolaev, et al., "Solubility Polytherm in the System HNO3-H20-(C4H90)PO(C4H9)2", Dokladv Akademii Nauk SSSR, 160(4):841-844 (1965).
Ning, et al., "Activating Mutations of c-Kit at Codon 816 Confer Drug Resistance in Human Leukemia Cells," Leukemia and Lymphoma, 41(5-6):513-522 (2001).
Nofal, et al., "Synthesis of Novel Uracil-5-Sulphonamide Derivatives of Possible Biological Activity", Egypt J. Chem., 33(4):375-380 (1990).
Nowell et al., "A Minute Chromosome in Human Chronic Granulocytic Leukemia," Science (Nov. 18, 1960) vol. 132, p. 1497.
O'Dell, et al., "Treatment of Rheumatoid Arthritis with Methotrexate Alone, Sulfasalazine and Hydroxychloroquine, or a Combination of All Three Medications", New England J. Med., 334(20):1287-1291(1996).
Okano, et al., "o-Bromophenylzinc Compound: A Readily Available and Efficient Synthetic Equivalent of o-Phenylene 1-Anion 2-Cation", Tetrahedron Letters 39:3001-3004 (1998).
Okishio, et al., "Differential Ligand Recognition by the Src and Phosphatidylinositol 3-Kinase Src Homology 3 Domains: Circular Dichroism and Ultraviolet Resonance Raman Studies", Biochemistrv, 42:208-216 (2003).
Okishio, et al., "Identification of Tyrosine Residues Involved in Ligand Recognition by the Phosphatidylinositol 3-Kinase Src Homology 3 Domain: Circular Dichroism and UV Resonance Raman Studies", Biochemistrv, 40:15797-15804 (2001).
Okishio, et al., "Role of the Conserved Acidic Residue Asp21 in the Structure of Phosphatidylinositol 3-Kinase Src Homolgy 3 Domain: Circular Dichroism and Nuclear Maqnetic Resonance Studies", Biochemistry 40:119-129 (2001).
Okram, Barun et al.: "A General Strategy for Creating "Inactive-Conformation" Abl Inhibitors" Chemistry&Biology (Cambridge, MA, US), 13(7), 779-786 Coden: CBOLE2; ISSN: 1074-5521, 2006, XP002469183 table 1 the whole document.
O'Neill, "Targeting Signal Transduction as a Strategy to Treat Inflammatory Diseases", Nature Review Drug Discovery, Published Online Jun. 9, 2006, www.nature.com/reviews/druqdisc.
Palmer, Brian, D. et al.: "Structure-Activity Relationships For 2-Anilino-6-Phenylpyrido[2,3-d]Pyrimidin-7(8H)-Ones As Inhibitors of the Cellular Checkpoint Kinase Wee1" Bioorganic & Medicinal Chemistry Letters, 15(7), 1931-1935 Coden: BMCLE8; ISSN: 0960-894X, 2005, XP004789411 p. 1933.
Parang, et al., "Mechanism-based Design of a Protein Kinase Inhibitor", Nature Structural Bioloav, 8( 1 ):37-41 (2001).
Pargellis, et al., "Inhibition of p38 MAP Kinase by Utilizing a Novel Allosteric Binding Site", Nature Structural Bioloav, 9(4 ):268-272 (2002).
Park, et al., "Mechanism of met Oncogene Activation", Cell, 45:895-904 (1986).
Pearlman, et al., "Assisted Model Building with Energy Refinement", Amber Home Page, amber.scripts.edu.

Pedersen, "The Preparation of Some N-Methyl-1,2,3-Triazoles", Acta Chimica Scandinavica, 13(5): 888-892 (1959).
Peng, et al., "Identification of Novel Inhibitors of BCR-ABL Tyrosine Kinase via Virtual Screening", Bioorganic & Medicinal Chemistry Letters, 13:3693-3699 (2003).
Pereira, et al., "The Role of c-kit and Imatinib Mesylate in Uveal Melanoma", Journal of Carcinogenesis, 4:19 (2005), downloaded from www.carcinogenesis.com/content/4/1/19, Sep. 3, 2008.
Peyssonnaux, C. et al., "The RafIMEK/ERK pathway: new concepts of activation," Biol. Cell (2001) 93: 53-62.
Pham, D. M. et al., "KIT and Melanoma: Biological Insights and Clinical Implications," Yonsei Medical Journal, vol. 61, No. 7, (Jul. 1, 2020), pp. 562-571.
Picard, et al., Inhibitors of Acyl-CoA: Cholesterol O-Acyltrasferase. 17. Structure-Activity Relationships of Several Series of Compounds.
Pierrat, et al, "Solid Phase Synthesis of Pyridine-Based Derivatives from a 2-Chloro-5-Bromopyridine Scaffold," J Comb. Chem. (2005) 7 (6): 879-886.
Pluk et al., "Autoinhibition of c-Abl," Cell (Jan. 25, 2002) vol. 108, pp. 247-259.
Ponzetto, et al., "A Novel Recognition Motif for Phosphatidylinositol 3-Kinase Binding Mediates Its Association with the Hepatocyte Growth Factor/Scatter Factor Receptor", Molecular and Cellular Bioloav, 13(8):4600-4608 (1993).
Protsenko, S.A., "Targeted Therapy in Melanoma, Gastrointestinal Stromal Tumors, Dermatofibrosarcoma Protuberans", Practical Oncology, vol. 11, No. 3, (2010), pp. 162-170.
Raimbault, et al., "Effects of pH and KCI on the Conformations of Creatine Kinase from Rabbit Muscle", Eur. J. Biochem., 234:570-578 (1995).
Ranatunge, et al., "Synthesis and Selective Cyclooxygenase-2 Inhibitory Activity of a Series of Novel, Nitric Oxide Donor-Containing Pyrazoles," J Med Chem. (2004) 47: 2180-2193.
Reardon, D. et al., "Effect of CYP3A-inducing anti-epileptics on sorafenib exposure: results of a phase II study of sorafenib plus daily temozolomide in adults with recurrent gliosblastoma", J. Neurooncol. (2011), 101: pp. 57-66.
Rebek, et al. "Convergent Functional Groups: Synthetic and Structural Studies", J. Am. Chem. Soc., 107:7476-7481 (1985).
Rebek, et al., "Convergent Functional Groups. 2. Structure and Selectivity in Olefin Epoxidation with Peracids", J. Org. Chem., 51:1649-1653 (1986).
Reed, et al., "Circular Dichroic Evidence for an Ordered Sequence Ligand/Binding Site Interactions in the Catalytic Reaction of the cAMP-Dependent Protein Kinase", Biochemistry, 24:2967-2973 (1985).
Regan, et al., "Pyrazole Urea-Based Inhibitors of p38 MAP Kinase: From Lead Compound to Clinical Candidate", J. Med. Chem., 45:2994-3008 (2002).
Regan, et al., "Structure-Activity Relationships of the p38a MAP Kinase Inhibitor 1-(5-tert-Butyl-2-p-tolyl-2H-pyrazol-3-yl )-3-[4-(2-morpholi n-4-yl-ethoxy)naph-thalen-1-yl]urea (BI RB 796)", J. Med. Chem., 46:4676-4686 (2003).
Reis, R. et al., "Molecular characterization of PDGFR-a/PDGF-A and c-KIT/SCF in gliosarcomas", Cellular Oncology, 2005; 27: pp. 319-326.
Remington, The Science and Practice of Pharmacy, Nineteenth Edition-1995, pp. 710-712.
Response to Office Action of U.S. Appl. No. 14/351,840 dated Sep. 28, 2015, 11 pages.
Rooney, et al., "Inhibitors of Gylcolic Acid Oxidase. 4-Substituted 3-Hydroxy-1 H-pyrrole-2,5-dione Derivatives", J. Med. Chem., 26(5):700-714 (1983).
Roux, et al., "ERK and p38 MAPK-Activated Protein Kinases: a Family of Protein Kinases with Diverse Biological Functions", Microbiology and Molecular Biology Reviews, 68(2):320- 344 (2004).
Rowley, "A New Consistent Chromosomal Abnormality in Chronic Myelogenous Leukaemia identified by Quinacrine Flourescence and Giemsa Staining," Nature (Jun. 1, 1973) vol. 243, pp. 290-293.
Rubin, et al., "Gastrointestinal stromal tumour," The Lancet Oncology, 369(9574): 1731-1741 (2007).

(56) References Cited

OTHER PUBLICATIONS

Russell, et al., "3-[3-(Piperdin-1-yl)propyllindoles as Highly Selective h5-HT1D Receptor", J. Med. Chem., 42:4981-5001 (1999).
Rutkowski, et al., "Gastrointestinal stromal tumours (GIST)—2018", Oncology in Clinical Practice, 14(6):399-407 (2019).
Saiga, et al., "Consecutive Cross-Coupling of o-Phenylenedizinc Compound with Acyl and/or Aryl Halides in the Presence of Pd(0)-tris(2,4,6-trimethoxyphenyl)phosphine", Tetrahedron Letters, 41:4629-4632 (2000).
Sakamoto, et al., "Condensed Heteroaromatic Ring Systems. XIX. Synthesis and Reactions of 5-(Tributylstannyl)Isoxazoles", Tetrahedron, 4 7(28):5111-5118 (1991).
Sakuma, et al., "c-kit Gene Mutations in Intracranial Germinomas", Cancer Sci, 95(9):716-720 (2004).
Salgia, "Studies on c-Kit and c-Met in Lung Cancer with Similarities to Stem Cells," Microscopy Society of America, 11(2):1-30 (2005).
Satsangi, et al., "1-(4-Substituted-thiazol-2-yl)hydatoins as Anti-inflammatory and CNS- Active Agents", Pharmazie, 38:341-342 (1983).
Sawyers, "Chronic Myeloid Leukemia," The New England Journal of Medicine (Apr. 29, 1999) vol. 340, No. 17, pp. 1330-1340.
Schindler et al., "Structural Mechanism for STI-571 Inhibition of Abelson Tyrosine Kinase," Science (Sep. 15, 2000) vol. 289, pp. 1938-1942.
Schlosser, et al., "Regiochemically Flexible Substitutions of Di-, Tri-, and Tetrahalopy:ridines: The Trialkylsily Trick," J Org. Chem. (2005) 70: 2494-2502.
Schmidt, et al., "Germline and Somatic Mutations in the Tyrosine Kinase Domain of the MET proto-oncoqene in Papillary Renal Carcinomas", Nature Genetics, 16:68-73 (1997).
Schmidt, et al., "Novel Mutations of the MET Proto-oncogene in Papillary Renal Carcinomas", Oncoqene, 18:2343-2350 (1999).
Schneeweiss Mathias, et al., "The KIT and PDGFRA switch-control inhibitor DCC-2618 blocks growth and survival of multiple neoplastic cell types in advanced mastocytosis," Haematologica (2018) vol. 103, No. 5, pp. 799-809.
Schneeweiss Mathias, et al., "The Multi-Kinase Inhibitor DCC-2618 Inhibits Proliferation and Survival of Neoplastic Mast Cells and Other Cell Types Involved in Systemic Mastocytosis," Blood (2016) vol. 128, No. 22, pp. 1965.
Seimiya, et al., "Telomere Shortening and Growth Inhibition of Human Cancer Cells by Novel Synthetic Telomerase Inhibitors MST-312, MST-295, and MST-199", Molecular Cancer Therapeutics, 1:657-665 (2002).
Seminario, et al., "Theoretical Study of a Molecular Resonant Tunneling Diode", J. Am. Chem. Soc., 122:3015-3020 (2000).
Seto, et al. "2-Substituted-4-aryl-6, 7 ,8,9-tetrahydro-5/ 1-p)'Timido [ 4, 5-b] [ 1,5 Joxazocin-5-oneasastructurallynewNK1 antagonist," Biorg Nied Chem. Tea. (2005) 15: 1485-1488.
Shah et al., "Overriding Imatinib Resistance with a Novel ABL Kinase Inhibitor," Science (Jul. 16. 2004) vol. 305, pp. 399-401.
Shah, et al., "Circular Dichroic Studies of Protein Kinase C and its Interactions with Calcium and Lipid Vesicles", Biochimica et Biophysica Acta, 1119:19-26 (1992).
Shah, et al., "Structured Development Approach for Amorphous Systems", Formulating Poorly Water Soluble Drugs, 267-310 (2012).
Shi, et al., "Abnormal Diels-Alder Reaction of 5-Alkoxythiazoles with Highly Reactive Dienophiles; 4-Phenyl-3H-1,2,4-triazole-3,5(4H)-dione, Diethyl Azodicarboxylate, and Diethyl Oxomalonate", Bull. Chem. Soc. Jpn., 65:3315-3321 (1992).
Shinkai, et al., "Coenzyme Models, Part 45. Synthesis of Atropisomeric Flavins and their Novel Redox-induced Racemisation", J. Chem. Soc. Perkin Trans., pp. 313-319 (1988).
Shiozaki, et al., "Impaired Differentiation of Endocrine and Exocrine Cells of the Pancreas in Transgenic Mouse Expressing the Truncated Type II Activin Receptor", Biochimica et Biophysica Acta, 1450:1-11 (1999).

Sihto, et al., "KIT and Platelet-Derived Growth Factor Receptor Alpha Tyrosine Kinase Gene 1-30 Mutations and KIT Amplifications in Human Solid Tumors," Journal of Clinical Oncology, 23(1):49-57 (2005).
Sircar et al., "Synthesis of 4-Hydroxy-N-[5-(hydroxymethyl)-3-isoxazolyl]2-methyl-2H-1,2-bsnzo-thiazine-3- carboxamide 1,1-Dioxide and [(5-Methyl-3-isoxazolyl)amino]oxoacetic Acid. Major Metabolites of Isoxicam," J. Org. Chem. (1985) vol. 50, pp. 5723-5727.
Smith et al., "Ripretinib (DCC-2618) is a switch control kinase inhibitor of a broad spectrum of oncogenic and drug-resistant KIT and PDGFRA variants," Cancer Cell (2019), vol. 35, No. 5, pp. 738-759.
STN Registry Database RN 1225278-16-9.
Stout, et al., "High-Throughput Structural Biology in Drug Discovery: Protein Kinases", Current Pharmaceutical Design, 10:1069-1082 (2004).
Sugden, et al., ""Stress-Responsive" Mitogen-Activated Protein Kinases (c-Jun N-Terminal Kinases and p38 Mitogen-Activated Protein Kinases) in the Myocardium", Circulation Research—Journal of the American Heart Association, 83:345-352 (1998).
Szucs, Z. et al., "Promising novel therapeutic approaches in the management of gastronitestinal stromal tumors", Future Oncology, (2017), vol. 13(2), pp. 185-194.
Tanis, et al., "Two Distinct Phosphorylation Pathways Have Additive Effects on Abl Family Kinase Activation", Molecular and Cellular Bioloav, 23(11 ):3884-3896 (2003).
Tanno, F. et al., "Evaluation of Hypromellose Acetate Succinate (HPMCAS) as a Carrier in Solid Dispersions", Journal of Drug Development and Industrial Pharmacy, vol. 30, No. 1, pp. 9-17 (2004).
Tarn, et al., "Analysis of KIT Mutations in Sporadic and Familial Gastrointestinal Stromal Tumors: Therapeutic Implications through Protein Modeling, " Clinical cancer research : an official journal of the American Association for Cancer Research, 11(10):3668-3677 (2005).
Teague, "Implications of Protein Flexibility for Drug Discovery", Nature Reviews, 2:527-541 (2003).
Tian, et al., "Activating c-kit Gene Mutations in Human Germ Cell Tumors," American Journal of Pathology, 154(6): 1643-1647 (1999).
Tominaga, et al., "General model for Estimation of the Inhibition of Protein Kinases Using Monte Carlo Simulations", J. Med. Chem., 47:2534-2549 (2004).
Tremblay, et al., "Efficient Solid-Phase Synthesis of Sulfahydantoins", J. Comb. Chem., 4:429-435 (2002).
Tsuzuki, et al., "Synthesis and Structure-Activity Relationships of Novel ?-Substituted 1,4-Dihydro-4-oxo-1-(2-thiazolyl)-1,8-napthyridine-3-carboxylic Acids as Antitumor Agents. Part 2", J. Med. Chem., 47:2097-2109 (2004).
Van Etten, "Cycling, Stressed-out and Nervous: Ceiluiar Functions of c-Abi," Trends in Cell Biology (May 1999) vol. 9, pp. 179-186.
Venter, et al., "The Sequence of the Human Genome", Science, 291:1304-1351, Feb. 16, 2001; Erratum, Jun. 8, 2001.
Vladimirova, L.U., "Usage of MEK Inhibitors in Oncology: Results and Perspectives", Modern Natural Science Successes, No. 3, https://s.natural-sciences.m/pdf/2015/3/34730.pdf., (2015), pp. 18-30.
Von Bubnoff, et al., "BCR-ABL gene mutations in relation to clinical resistance of Philadelphia-chromosome-positive leukemia to STI571. a prospective study," The Lancet (Feb. 9, 2002) vol. 359, pp. 487-491.
Waetzig, et al., "Review Article: Mitogen-Activated Protein Kinases in Chronic Intestinal Inflammation—Targeting Ancient Pathways to Treat Modern Diseases", Aliment Pharmacol Ther, 18:17-32 (2003).
Wan et al., "Mechanism of Activation of the RAF-ERK Signaling Pathway by Oncogenic Mutations of B-RAF," Cell (Mar. 19, 2004) vol. 116. pp. 855-867.
Wardelmann, "Acquired resistance to imatinib in gastrointestinal stromal tumours caused by multiple KIT mutations," The Lancet Oncology, 6(4):249-251 (2005).
Warren, et al., "Using polymeric precipitation inhibitors to improve the absorption of poorly water-soluble drugs: A mechanistic basis for utility", Journal of Drug Targeting 18(10): 704-731 (2010).

(56) References Cited

OTHER PUBLICATIONS

Welker, et al., "Glucocorticoid-Induced Modulation of Cytokine Secretion from Normal and Leukemic Human Myelomonocytic Cells", Int. Arch. Allergy Immunol, 109:110-115 (1996).
Wentland, et al., "3-Quinolinecarboxamides. A Series of Novel Orally-Active Antiherpetic Agents", J. Med. Chem., 36:1580-1596 (1993).
Williams III, et al., Solid-State Techniques for Improving Solubility, Formulating Poorly Soluble Drugs vol. 3, 95-131 (2012).
Wilson, et al., "The Structural Basis for the Specificity of Pyridinylimidazole Inhibitors of p38 MAP Kinase", Chemistry & Biology, 4(6):423-431 (1997).
Wilson, et el., "Laser-Jet Delayed Trapping: Electron-Transfer Trapping of the Photoenol from 2-Methylbenzophenone", J. Am. Chem. Soc., 109:4743-4745 (1987).
Wolter, et al., "Copper-Catalyzed Coupling of Aryl Iodides with Aliphatic Alcohols", Organic Letters, 4(6):973-976 (2002).
Wrana, et al., "Mechanism of Activation of the TGF-B Receptor", Nature, 370:341-347 (1994).
Wu, et al., "Discovery of a Novel Family of CDK Inhibitors with the Program LIDAEUS:Structual Basis for Ligand-Induced Disordering of the Acivation Loop", Structure, 11:399-410 (2003).
Yang, et al., "Molecular Mechanism for the Regulation of Protein Kinase B/Akt by Hydrophobic Motif Phosphorylation", Molecular Cell, 9:1227-1240 (2002).
Yang, et al., "Palladium-Catalyzed Amination of Arly Halides and Sulfonates", Journal of Organometallic Chemistry, 576:125-146 (1999).
Yarden, et al., "Human Proto-oncogene c-kit: a New Cell Surface Receptor Tyrosine Kinase for an Unidentified Ligand", The EMBO Journal, 6(11):3341-3351 (1987).
Yoneda, et al., "A New Synthesis of Purines", J.C.S. Chem. Comm., pq. 551 (1974).
Yonezawa, et al., "Synthesis of Sequentially Controlled Isomeric, Wholly aromatic Polyketones Composed of 2-trifluoromethylbiphenylene and 2,2'-dimethoxybiphenylene Units", Reactive & Functional Polymers, 52:19-30 (2002).
Yoshimoto, et al., "Correlation Analysis of Baker's Studies on Enzyme Inhibition. 2. Chymotrypsin, Trypsin, Thymidine Phosphorylase, Uridine Phosphorylase, Thimidylate Synthetase, Cytosine Nucleoside Deaminase, Dihodrofolate Dehydrogenase, Glutamate Dehydrogenase, Lactate Dehydrogenase, and Glyceraldehydephosphate Reductase, Malate Dehydroqenase", Journal of Medicinal Chemistrv, 19(1):71-98 (1976).
Yoshino, et al., "Organic Phosphorous Compounds. 2. Synthesis and Coronary Vasodilator Activity of (Benzothiazolybenzyl) Phosphonate Derivatives", J. Med. Chem., 32:1528-1532 (1989).
Yu, et al., "Frequency of TPR-MET Rearrangement in Patients with Gastric Carcinoma and in First-Degree Relatives", Cancer, 88(8):1801-1806 (2000).
Zaidi, et al., "New Anti-Mycobacterial Hydantoins", Pharmazie, 35:755-756 (1980).
Zhen, et al., "Structural and Functional Domains Critical for Constitutive Activation of the HGF-Receptor (Met)", Oncoqene, 9(6):1691-1697 (1994).
Zustovich, F. et al., "Sorafenib plus Daily Low-dose Temozolomide for Relapsed Glioblastoma: A Phase II Study", Anticancer Research (2013), 33: pp. 3487-3494.
Zvilichovsky, et al., "Aminolysis and Polymerization of 3-(p-Toluenesulfonoxy) Hydantoin", Israel Journal of Chemistry, 7:547-554 (1969).
Paudel, A. et al."Manufacturing of solid dispersions of poorly water soluble drugs by spray drying: Formulation and process considerations," International Journal of Pharmaceutics, vol. 453, Issue 1, (Aug. 30, 2013), pp. 253-284.
Chiang, P., et al."In Vitro and In Vivo Evaluation of Amorphous Solid Dispersions Generated by Different Bench-Scale Processes, Using Griseofulvin as a Model Compound", The AAPS Journal, (Apr. 2013), vol. 15, No. 2, doi:10.1208/s12248-013-9469-3, pp. 608-617.
Medscape (ripretinib Rx) https://reference.medscape.com/drug/qinlock-ripretinib-4000074, (2020), 12 pages.
Zinner, et al., "Zur Weiteren Kenntnis Bicyclischer 3.5-Dioxopyrazolidine", Die Pharmazie, 25(5):309-312 (1970).
Instructions for medical use of the drug Sutent Registration No. LI002512/07, found on the website www.grls.rosminzdrav.ni, (Dec. 27, 2018), 27 pages.

\* cited by examiner

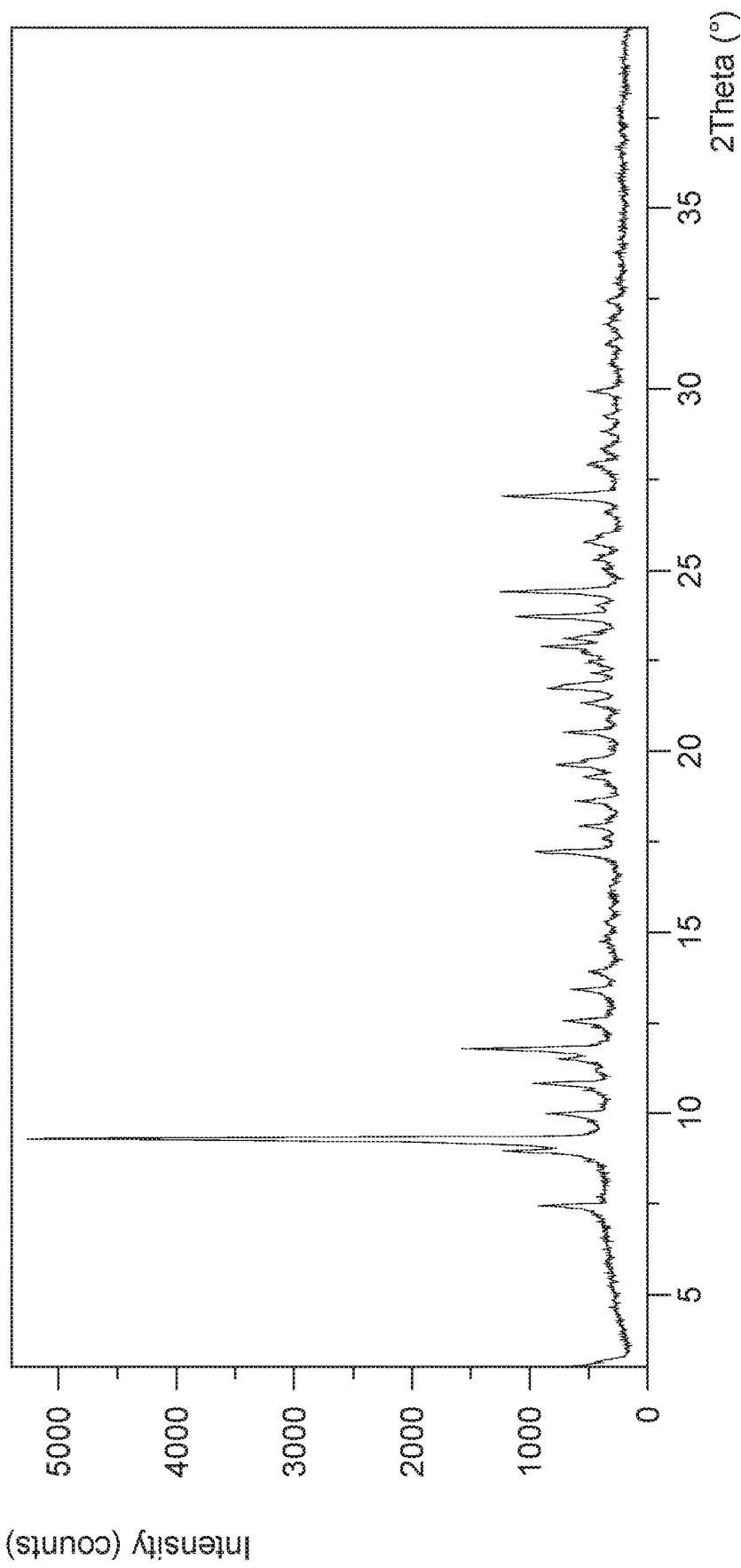
Figure 1 - PXRD pattern of ripretinib form 1

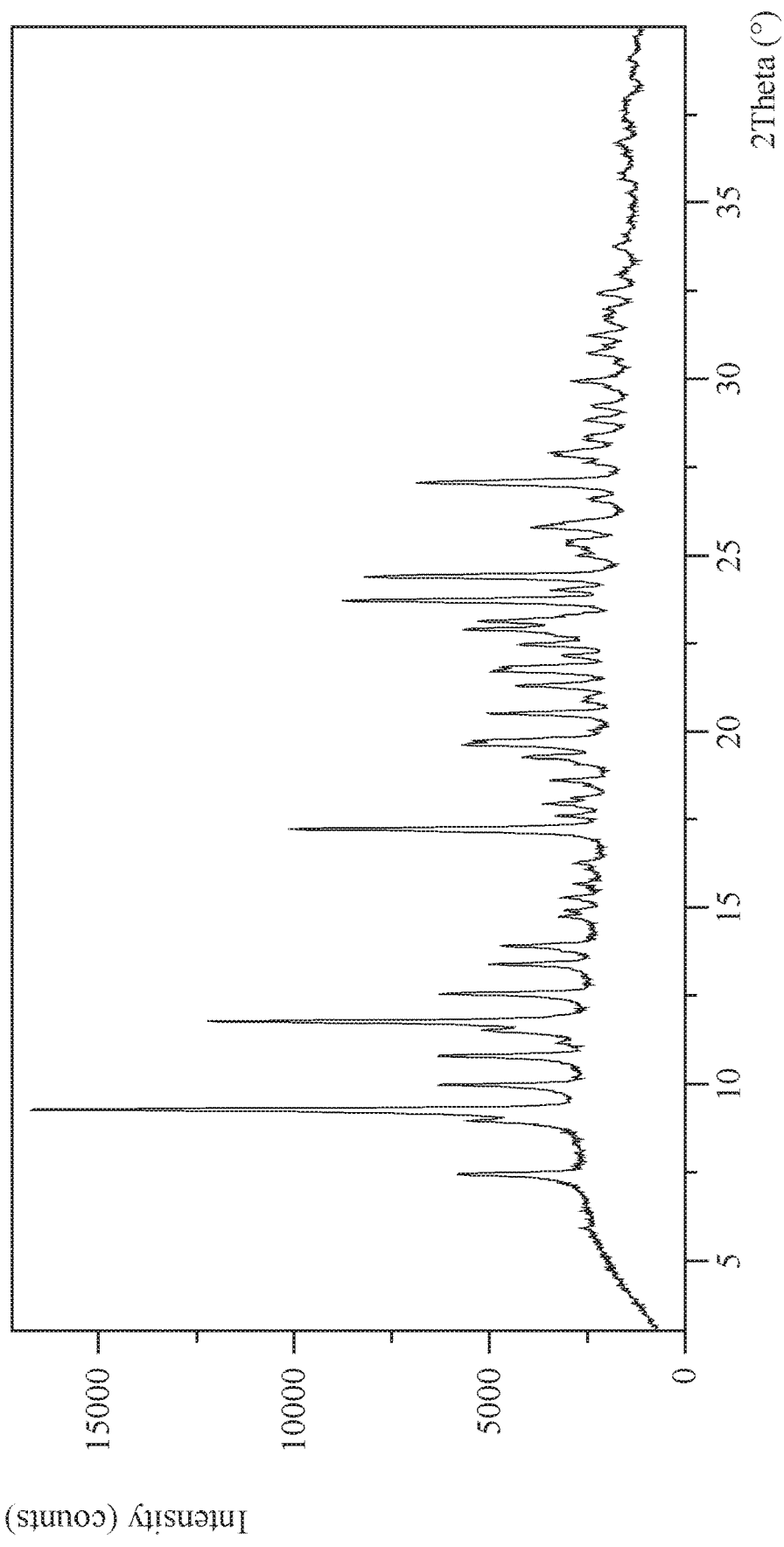
Figure 2 - PXRD pattern of ripretinib form 1

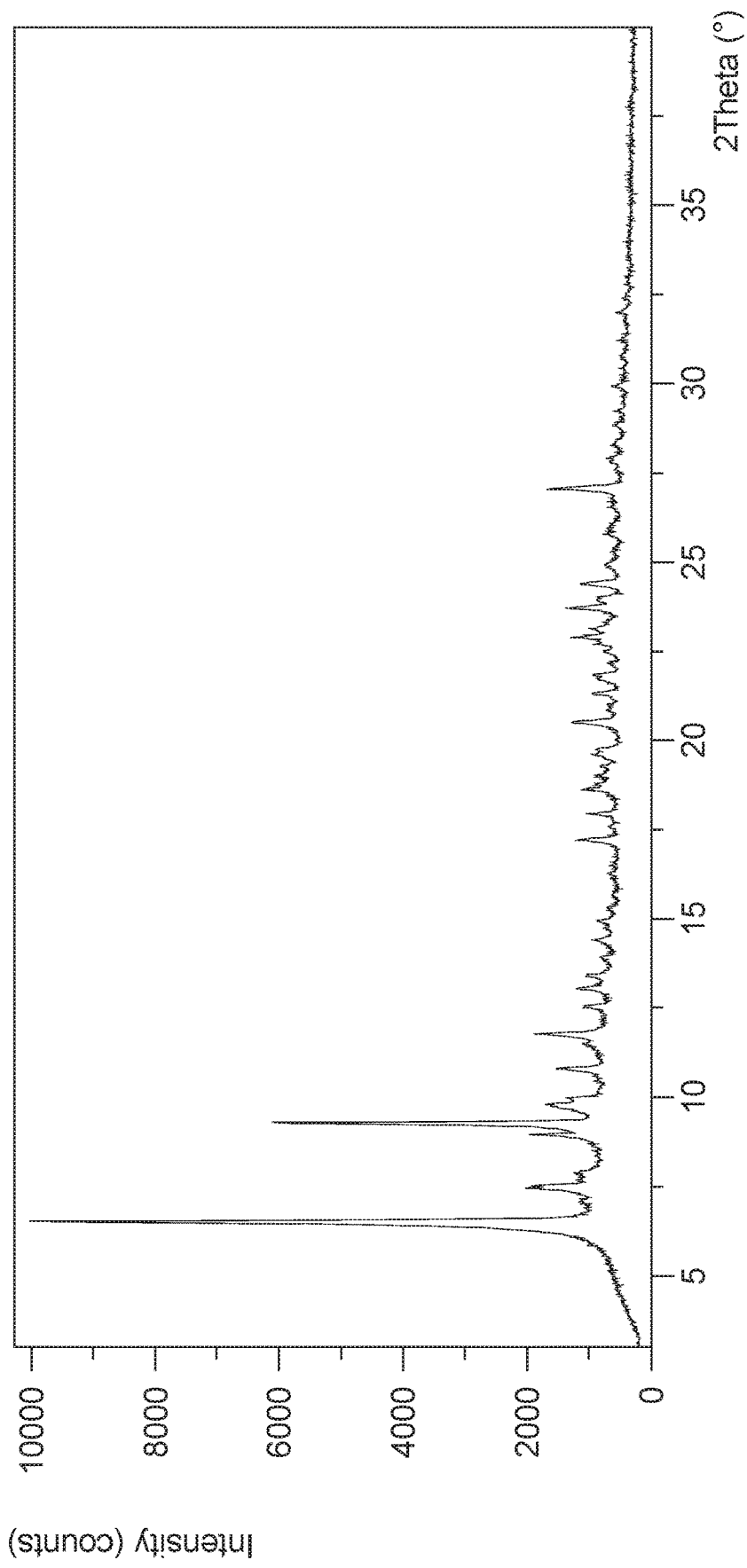

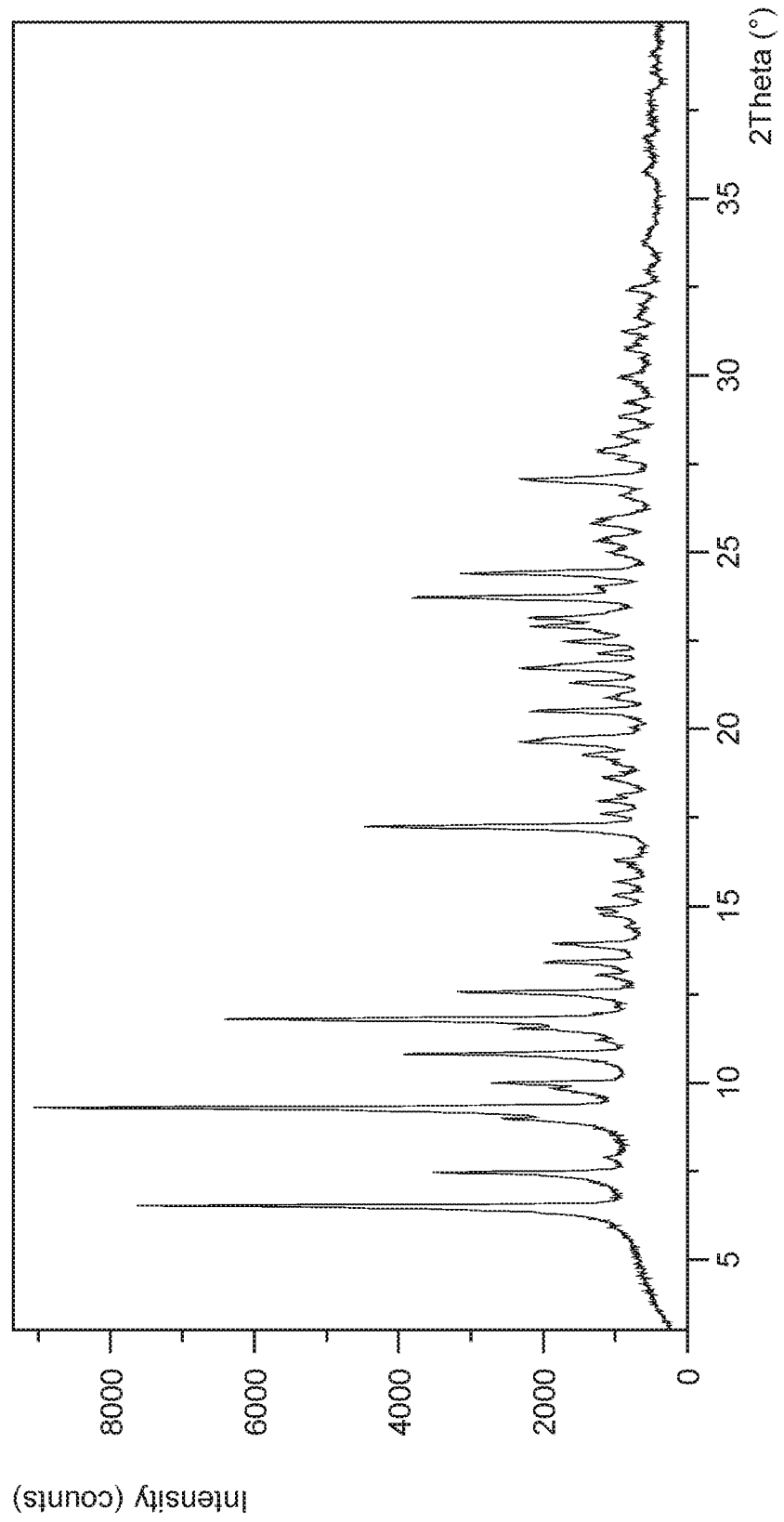
Figure 4 - PXRD pattern of ripretinib form 3

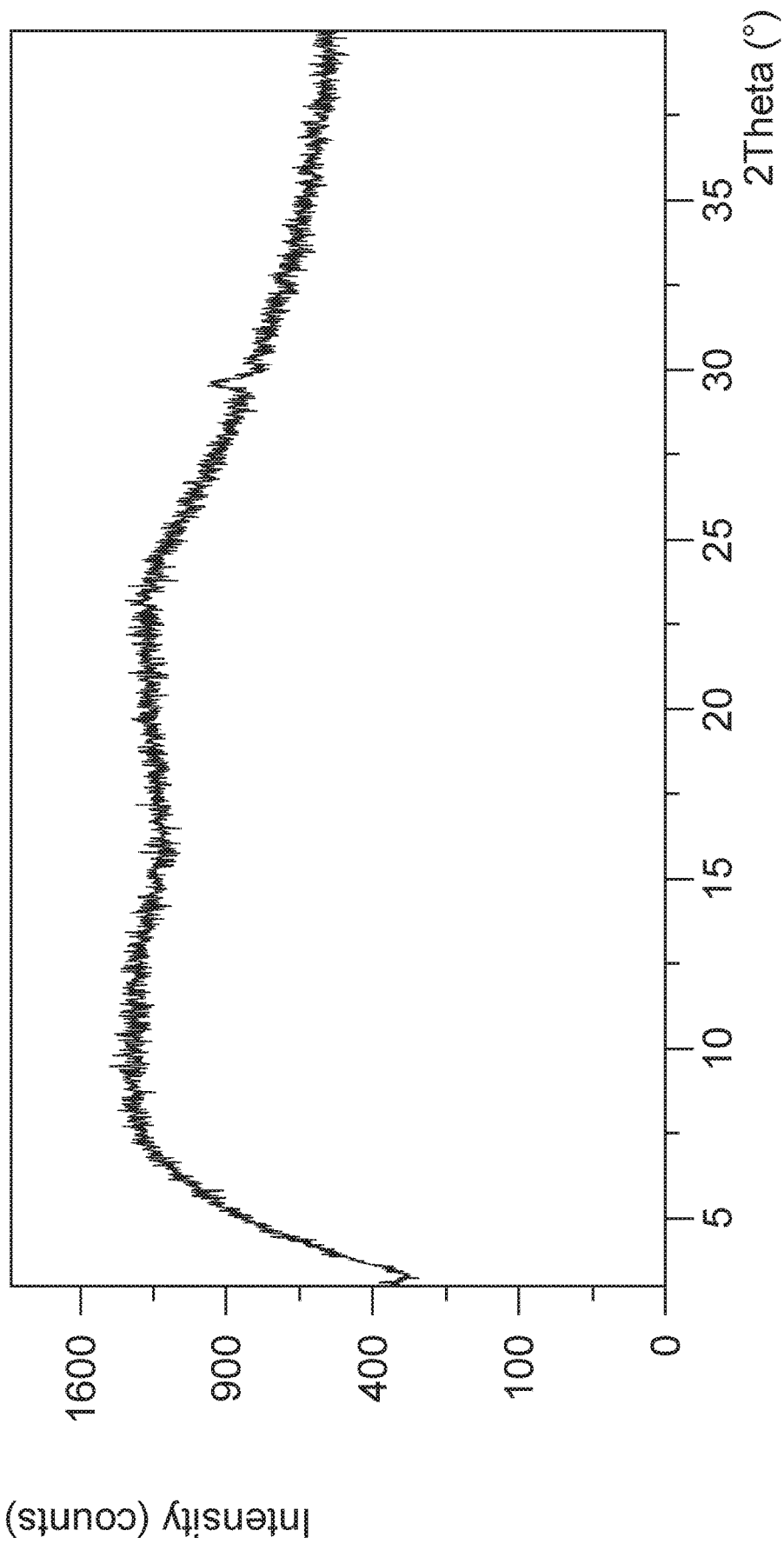
Figure 5 - PXRD pattern of ripretinib amorphous form

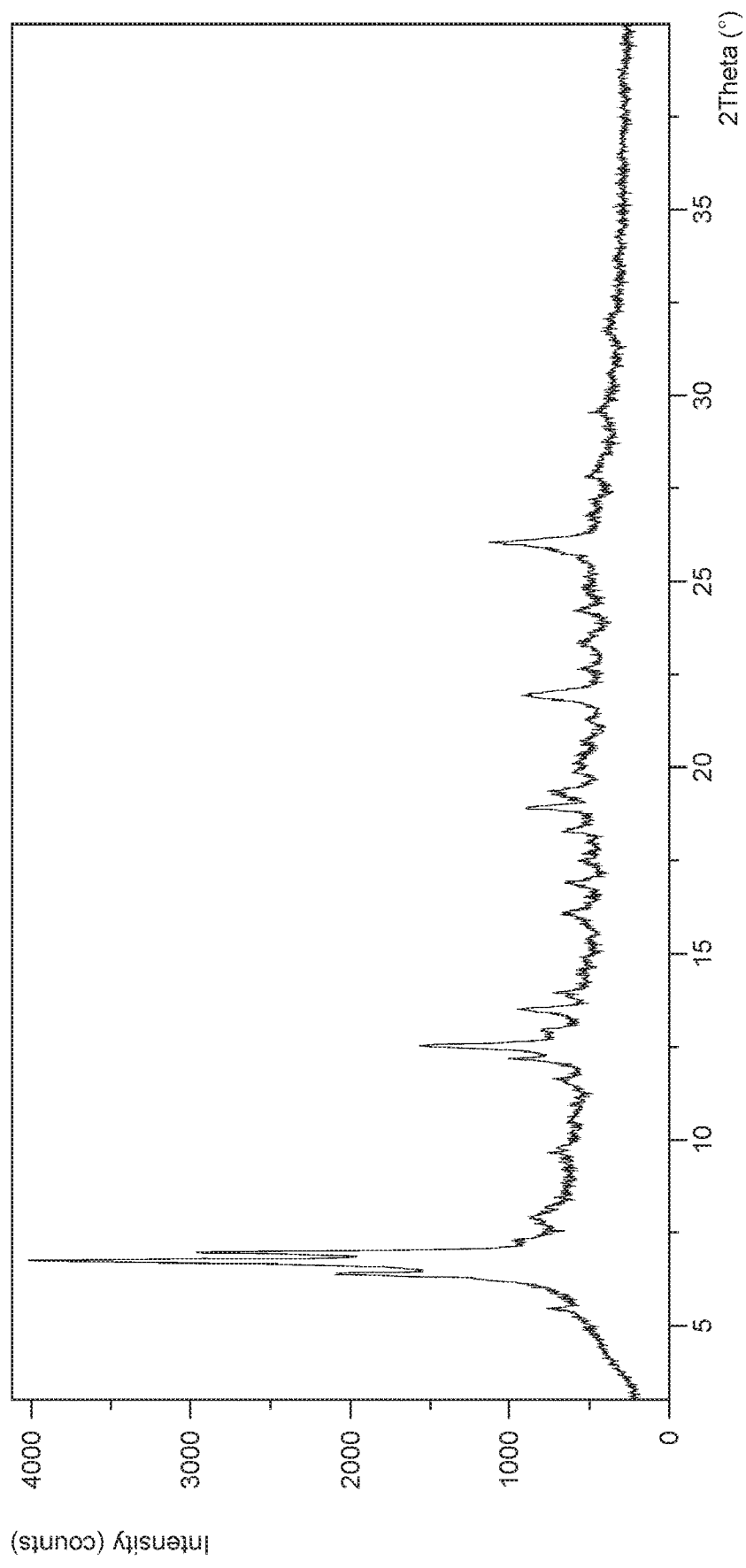
Figure 6 - PXRD pattern of ripretinib form 4

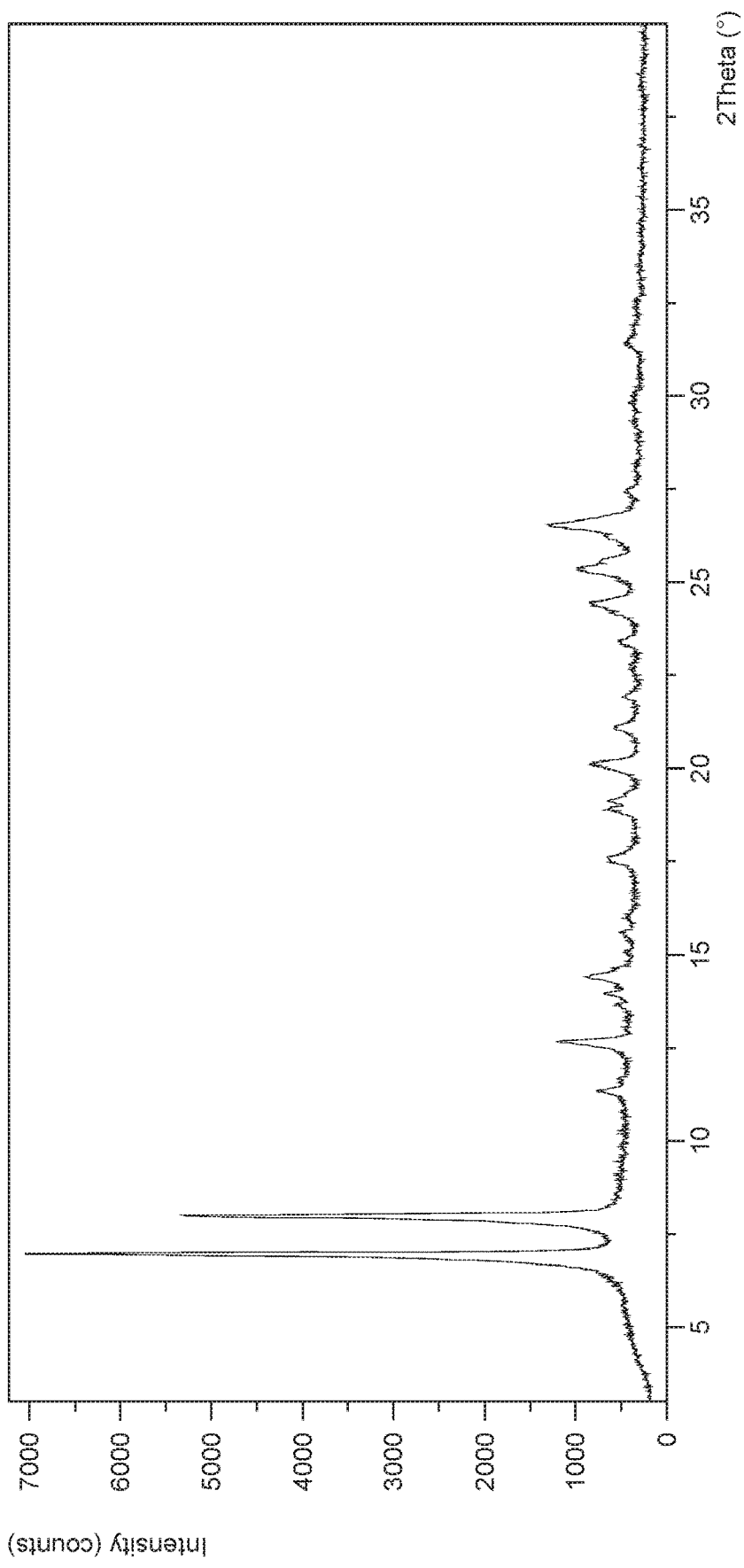
Figure 7 - PXRD pattern of ripretinib form 5

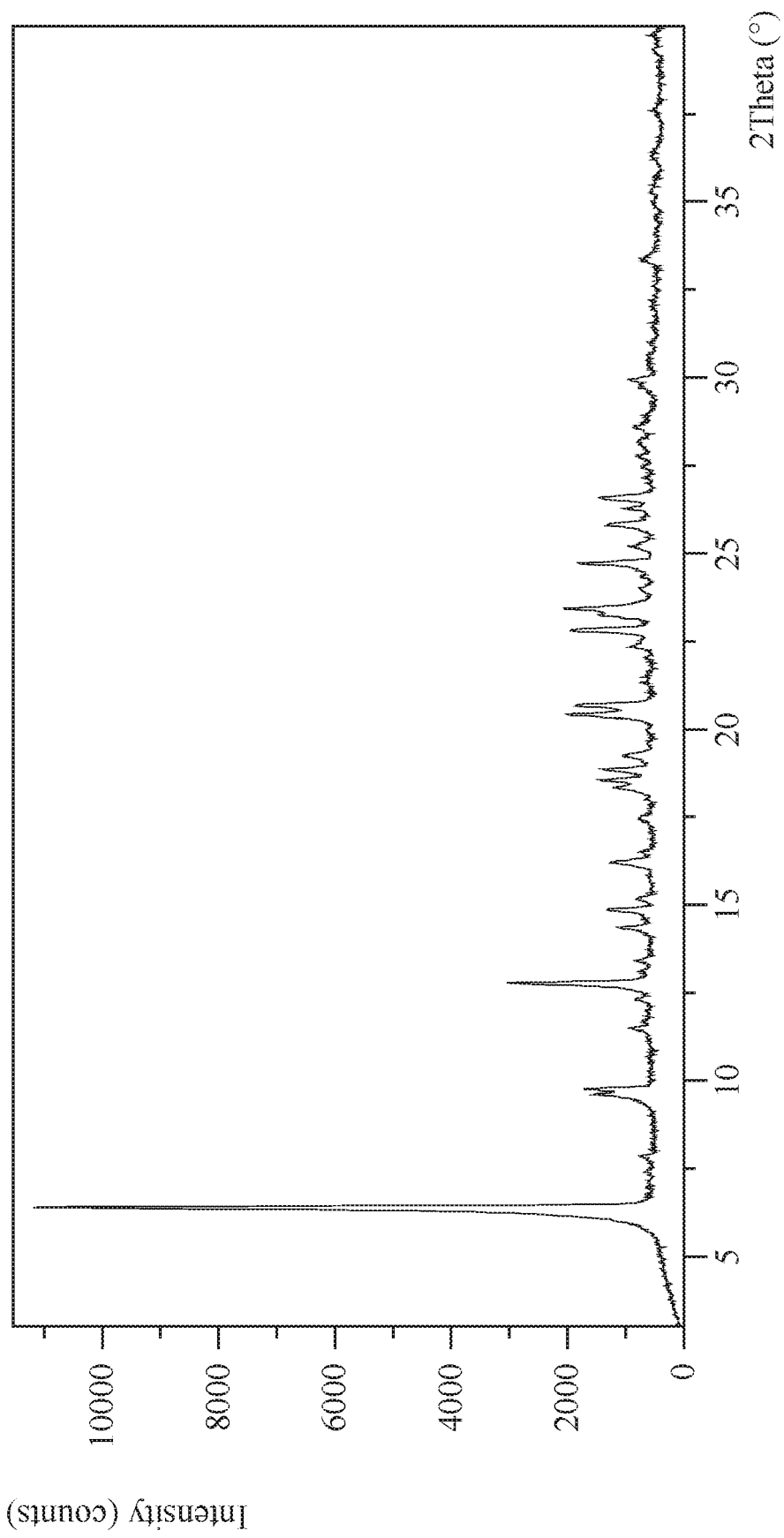
Figure 8 - PXRD pattern of ripretinib form 9

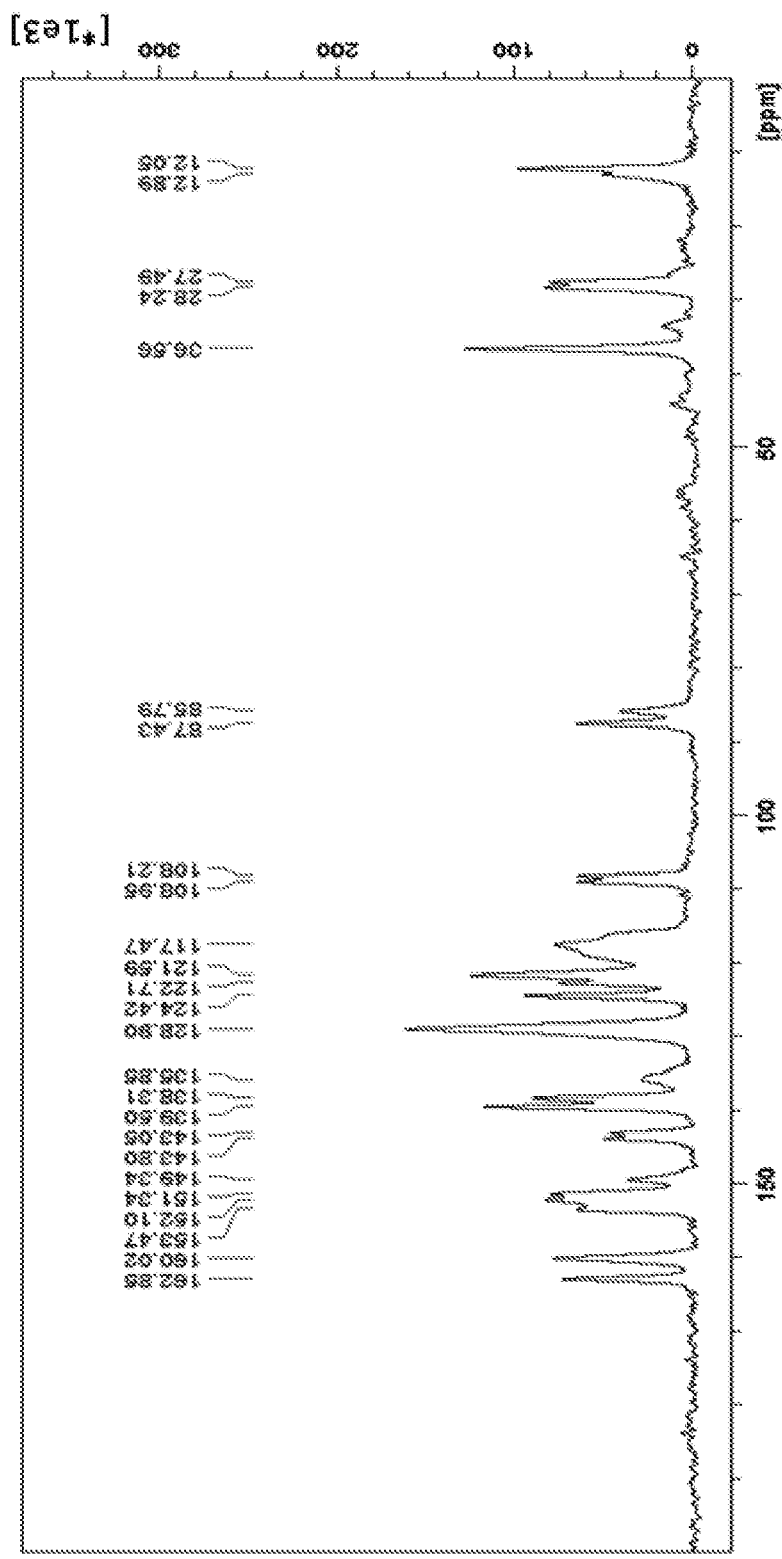
Figure 9 - 1H-13C CP-MAS spectra of Ripretinib form 1

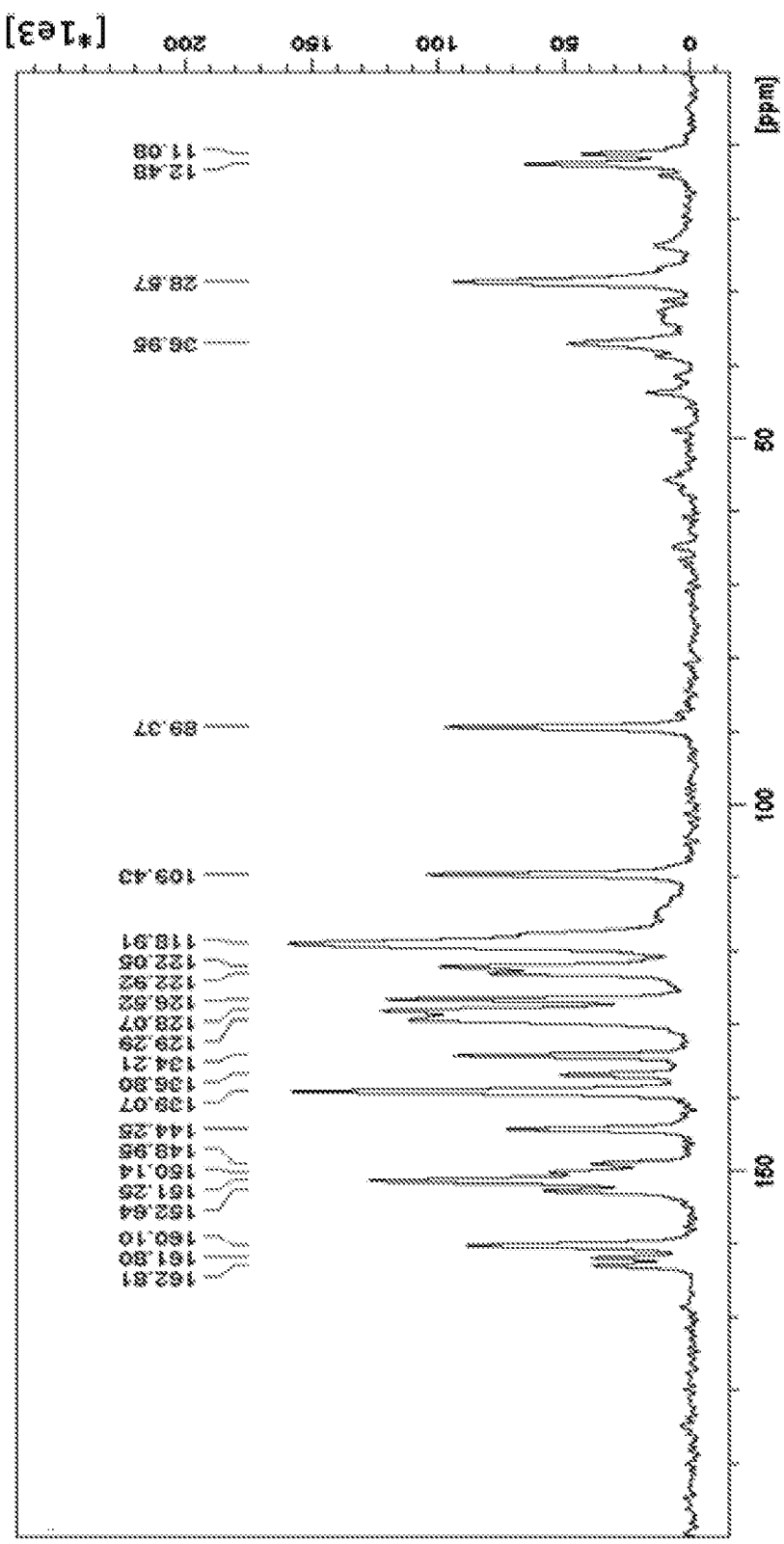
Figure 10 - 1H-13C CP-MAS spectra of Ripretinib form 3

SOLID STATE FORMS OF RIPRETINIB

CROSS REFERENCE TO RELATED APPLICATIONS

This application is a National Stage of, and claims priority to and the benefit of, International Patent Application No. PCT/US2020/021957 filed Mar. 11, 2020, which, in turn, claims the benefit of and priority to, U.S. Provisional Application No. 62/816,547, filed Mar. 11, 2019, U.S. Provisional Application No. 62/823,039, filed Mar. 25, 2019, U.S. Provisional Application No. 62/831,816, filed Apr. 10, 2019, and U.S. Provisional Application No. 62/892,045, filed Aug. 27, 2019, the entire disclosures of each of which are incorporated by reference herein.

TECHNICAL FIELD

The present disclosure relates to solid state forms of ripretinib, processes for preparation thereof, as well as a pharmaceutical composition including the same.

BACKGROUND

Ripretinib has the chemical name N-(4-bromo-5-(1-ethyl-7-(methylamino)-2-oxo-1,2-dihydro-1,6-naphthyridin-3-yl)-2-fluorophenyl)-N'-phenylurea. Ripretinib has the following chemical structure:

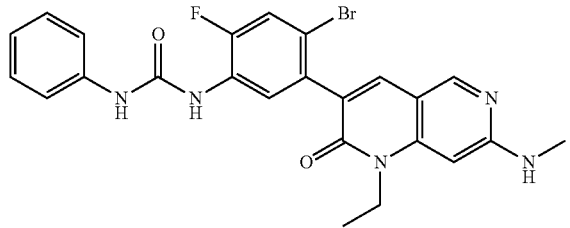 [SMILES: CCn1c(=O)c(-c2cc(NC(=O)Nc3ccccc3)c(F)cc2Br)cc2cnc(NC)cc21]

Ripretinib (DCC-2618) is an investigational, orally administered kinase switch control inhibitor being developed for the treatment of gastrointestinal stromal tumors (GIST), advanced systemic mastocytosis (ASM), gliomas, and other solid tumors driven by tyrosine-protein kinase KIT (KIT) or platelet derived growth factor alpha (PDGFRα) kinase.

Ripretinib is disclosed in U.S. Pat. No. 8,461,179.

Polymorphism, the occurrence of different crystal forms, is a property of some molecules and molecular complexes. A single compound, like ripretinib or salt thereof, may give rise to a variety of polymorphs having distinct crystal structures and physical properties like melting point, thermal behaviors (e.g. measured by thermogravimetric analysis—"TGA", or differential scanning calorimetry—"DSC"), powder X-ray diffraction (PXRD) pattern, infrared absorption fingerprint, Raman absorption fingerprint, and solid state ($^{13}$C—) NMR spectrum. One or more of these techniques may be used to distinguish different polymorphic forms of a compound.

Different salts and solid state forms (including solvated forms) of an active pharmaceutical ingredient may possess different properties. Such variations in the properties of different salts and solid state forms and solvates may provide a basis for improving formulation, for example, by facilitating better processing or handling characteristics, improving the dissolution profile, or improving stability (polymorph as well as chemical stability) and shelf-life. These variations in the properties of different salts and solid state forms may also provide improvements to the final dosage form, for instance, if they serve to improve bioavailability. Different salts and solid state forms and solvates of an active pharmaceutical ingredient may also give rise to a variety of polymorphs or crystalline forms, which may in turn provide additional opportunities to use variations in the properties and characteristics of a solid active pharmaceutical ingredient for providing an improved product.

Discovering new salts, solid state forms, cocrystals and solvates of a pharmaceutical product can provide materials having desirable processing properties, such as ease of handling, ease of processing, storage stability, and ease of purification or as desirable intermediate crystal forms that facilitate conversion to other salts or polymorphic forms. New salts, polymorphic forms, cocrystals and solvates of a pharmaceutically useful compound can also provide an opportunity to improve the performance characteristics of a pharmaceutical product (dissolution profile, bioavailability, etc.). It enlarges the repertoire of materials that a formulation scientist has available for formulation optimization, for example by providing a product with different properties, e.g., a different crystal habit, higher crystallinity or polymorphic stability which may offer better processing or handling characteristics, improved dissolution profile, or improved shelf-life.

In the case of ripretinib, there is a need for a solid state form suitable for use in the pharmaceutical industry.

SUMMARY

The present disclosure relates to solid state forms of ripretinib, to processes for preparation thereof, and to pharmaceutical compositions including these solid state forms or combinations thereof.

The present disclosure encompasses process for preparation of solid state forms of ripretinib.

The present disclosure also provides uses of the solid state forms of ripretinib for preparing other solid state forms of ripretinib, salts of ripretinib, and solid state forms thereof.

In another embodiment, the present disclosure encompasses the above described solid state forms of ripretinib for use in the preparation of pharmaceutical compositions and/or formulations, and in another embodiments for the treatment of gastrointestinal stromal tumors (GIST), advanced systemic mastocytosis (ASM), gliomas, and other solid tumors driven by tyrosine-protein kinase KIT (KIT) or platelet derived growth factor alpha (PDGFRα) kinase.

In another embodiment, the present disclosure encompasses the use of the above described solid state forms of ripretinib for the preparation of pharmaceutical compositions and/or formulations.

The present disclosure further provides pharmaceutical compositions including solid state forms of ripretinib.

In yet another embodiment, the present disclosure encompasses pharmaceutical formulations including solid state forms of ripretinib or combinations thereof and at least one pharmaceutically acceptable excipient. The pharmaceutical composition or formulation includes oral dosage forms, e.g. tablet or capsule. The present disclosure encompasses processes to prepare said pharmaceutical formulations of solid state forms of ripretinib, including combining solid state forms of ripretinib or combinations thereof, prepared according to the present disclosure, with at least one pharmaceutically acceptable excipient.

The solid state forms of ripretinib as defined herein, as well as the pharmaceutical compositions or formulations of solid state forms of ripretinib prepared according to the present disclosure, can be used as medicaments, in embodiments for the treatment of gastrointestinal stromal tumors (GIST), advanced systemic mastocytosis (ASM), gliomas, and other solid tumors driven by tyrosine-protein kinase KIT (KIT) or platelet derived growth factor alpha (PDGFRα) kinase.

The present disclosure also provides methods of treating GIST or other condition as described in the present disclosure by administering a therapeutically effective amount of solid state forms of ripretinib or combinations thereof prepared according to the present disclosure, or at least one of the above pharmaceutical compositions or formulations, to a subject suffering from GIST, or otherwise in need of the treatment.

The present disclosure also provides uses of solid state forms of the present disclosure, or at least one of the above pharmaceutical compositions or formulations, for the manufacture of a medicament for treating gastrointestinal stromal tumors (GIST), advanced systemic mastocytosis (ASM), gliomas, and other solid tumors driven by tyrosine-protein kinase KIT (KIT) or platelet derived growth factor alpha (PDGFRα) kinase.

BRIEF DESCRIPTION OF THE FIGURES

FIG. 1 shows a powder X-ray diffraction pattern ("powder XRD" or "PXRD") of Ripretinib form 1 prepared in Example 1;

FIG. 2 shows a PXRD of Ripretinib form 1 prepared in Example 20;

FIG. 3 shows a PXRD of Ripretinib form 3 prepared in Example 6;

FIG. 4 shows a PXRD of Ripretinib form 3 prepared in Example 19;

FIG. 5 shows a PXRD of Ripretinib amorphous form;

FIG. 6 shows a PXRD of Ripretinib form 4;

FIG. 7 shows a PXRD of Ripretinib form 5;

FIG. 8 shows a PXRD pattern of Ripretinib form 9;

FIG. 9 shows a 1H-13C CP-MAS spectra of Ripretinib form 1; and

FIG. 10 shows a 1H-13C CP-MAS spectra of Ripretinib form 3.

DETAILED DESCRIPTION

The present disclosure relates to solid state forms of ripretinib, to processes for preparation thereof, and to pharmaceutical compositions including these solid state forms or combinations thereof.

The solid state forms of ripretinib according to the present disclosure may have advantageous properties selected from at least one of: chemical or polymorphic purity, flowability, solubility, dissolution rate, bioavailability, morphology or crystal habit, stability such as chemical stability as well as thermal and mechanical stability with respect to polymorphic conversion, stability towards dehydration and/or storage stability, a lower degree of hygroscopicity, low content of residual solvents and advantageous processing and handling characteristics such as compressibility, or bulk density.

A crystal form may be referred to herein as being characterized by graphical data "as depicted in" a Figure. Such data include, for example, powder X-ray diffractograms and solid state NMR spectra. As is well-known in the art, the graphical data potentially provides additional technical information to further define the respective solid state form (a so-called "fingerprint") which can not necessarily be described by reference to numerical values or peak positions alone. In any event, the skilled person will understand that such graphical representations of data may be subject to small variations, e.g., in peak relative intensities and peak positions due to factors such as variations in instrument response and variations in sample concentration and purity, which are well known to the skilled person. Nonetheless, the skilled person would readily be capable of comparing the graphical data in the Figures herein with graphical data generated for an unknown crystal form and confirm whether the two sets of graphical data are characterizing the same crystal form or two different crystal forms. A crystal form of ripretinib referred to herein as being characterized by graphical data "as depicted in" a Figure will thus be understood to include any crystal forms of ripretinib, characterized with the graphical data having such small variations, as are well known to the skilled person, in comparison with the Figure.

A solid state form (or polymorph) may be referred to herein as polymorphically pure or substantially free of any other solid state (or polymorphic) forms. As used herein in this context, the expression "substantially free of any other forms" will be understood to mean that the solid state form contains about 20% or less, about 10% or less, about 5% or less, about 2% or less, about 1% or less, or about 0% of any other forms of the subject compound as measured, for example, by PXRD. Thus, solid state forms of ripretinib and salts thereof described herein as substantially free of any other solid state forms would be understood to contain greater than about 80% (w/w), greater than about 90% (w/w), greater than about 95% (w/w), greater than about 98% (w/w), greater than about 99% (w/w), or about 100% (w/w) of the subject solid state forms of ripretinib. Accordingly, in some embodiments of the disclosure, the described solid state forms of ripretinib may contain from about 1% to about 20% (w/w), from about 5% to about 20% (w/w), or from about 5% to about 10% (w/w) of one or more other solid state forms of the same ripretinib.

The modifier "about" should be considered as disclosing the range defined by the absolute values of the two endpoints. For example, the expression "from about 2 to about 4" also discloses the range "from 2 to 4." When used to modify a single number, the term "about" may refer to plus or minus 10% of the indicated number and includes the indicated number. For example, "about 10%" may indicate a range of 9% to 11%, and "about 1" means from 0.9-1.1.

As used herein, unless stated otherwise, PXRD peaks reported herein are preferably measured using CuK$_\alpha$ radiation, $\lambda$=1.5418 Å. Preferably, PXRD peaks reported herein are measured using CuKα radiation, $\lambda$=1.5418 Å, at a temperature of 25±3° C..

As used herein, unless stated otherwise, $^{13}$C CP/MAS NMR spectra employing cross-polarization were acquired using the standard pulse scheme at spinning frequency of 12 kHz. The recycle delay was 8 s and the cross-polarization contact time was 2 ms. The strength of spin-locking fields B$_1$($^{13}$C) expressed in frequency units ω ½π=γB1 was 64 kHz, preferably at a temperature 293 K±3° C.

As used herein, the term "isolated" in reference to solid state forms of ripretinib and salts thereof of the present disclosure corresponds to solid state forms of ripretinib and salts thereof that are physically separated from the reaction mixture in which it is formed.

A thing, e.g., a reaction mixture, may be characterized herein as being at, or allowed to come to "room temperature", often abbreviated "RT." This means that the temperature of the thing is close to, or the same as, that of the space, e.g., the room or fume hood, in which the thing is located. Typically, room temperature is from about 20° C. to about 30° C., or about 22° C. to about 27° C., or about 25° C. A process or step may be referred to herein as being carried out "overnight." This refers to a time interval, e.g., for the process or step, that spans the time during the night, when that process or step may not be actively observed. This time interval is from about 8 to about 20 hours, or about 10 to about 18 hours, in embodiments about 16 hours.

As used herein, the expression "wet crystalline form" refers to a polymorph that was not dried using any conventional techniques to remove residual solvent. Examples for such conventional techniques can be, but not limited to, evaporation, vacuum drying, oven drying, drying under nitrogen flow, etc.

As used herein, the expression "dry crystalline form" refers to a polymorph that was dried using any conventional techniques to remove residual solvent. Examples of such conventional techniques can be, but are not limited to, evaporation, vacuum drying, oven drying, drying under nitrogen flow, etc.

As used herein, and unless stated otherwise, the term "anhydrous" in relation to crystalline ripretinib relates to a crystalline ripretinib which does not include any crystalline water (or other solvents) in a defined, stoichiometric amount within the crystal. Moreover, an "anhydrous" form does not contain more than 1% (w/w) of either water or organic solvents as measured for example by TGA.

The term "solvate", as used herein and unless indicated otherwise, refers to a crystal form that incorporates a solvent in the crystal structure. When the solvent is water, the solvate is often referred to as a "hydrate." The solvent in a solvate may be present in either a stoichiometric or in a non-stoichiometric amount.

The amount of solvent employed in a chemical process, e.g., a reaction or a crystallization, may be referred to herein as a number of "volumes" or "vol" or "V." For example, a material may be referred to as being suspended in 10 volumes (or 10 vol or 10V) of a solvent. In this context, this expression would be understood to mean milliliters of the solvent per gram of the material being suspended, such that suspending 5 grams of a material in 10 volumes of a solvent means that the solvent is used in an amount of 10 milliliters of the solvent per gram of the material that is being suspended or, in this example, 50 mL of the solvent. In another context, the term "v/v" may be used to indicate the number of volumes of a solvent that are added to a liquid mixture based on the volume of that mixture. For example, adding methyl tert-butyl ether (MTBE) (1.5 v/v) to a 100 ml reaction mixture would indicate that 150 mL of MTBE was added.

As used herein, the term "reduced pressure" refers to a pressure of about 10 mbar to about 50 mbar.

As used herein the term non-hygroscopic in relation to crystalline ripretinib refers to less than 0.2% (w/w) of water absorption after 24 h exposure to 25° C./80% RH, determined according to European Pharmacopoeia 10.0, chapter 01/2008:51100. Water can be for example atmospheric water.

The present disclosure includes solid state forms of ripretinib (free base). The present disclosure further includes crystalline forms of ripretinib. In embodiments, the crystalline forms according to the present invention may be anhydrous forms. In other embodiments, crystalline forms according to the present invention may be solvates including hydrates. In other embodiments, crystalline forms according to the invention may be mixed solvates. In yet further embodiments there is provided a solid state form of ripretinib which is amorphous.

The present disclosure further includes a solid state form of ripretinib designated as Form 1. Form 1 of ripretinib can be characterized by data selected from one or more of the following: a PXRD pattern having peaks at 9.3, 11.8, 17.2, 24.4 and 27.0 degrees 2-theta±0.2 degrees 2-theta; a PXRD pattern as depicted in FIG. 1; or combinations of these data. Alternatively, Form 1 of ripretinib can be characterized by data selected from one or more of the following: a PXRD pattern having peaks at 9.3, 11.8, 17.2, 24.4 and 27.0 degrees 2-theta±0.2 degrees 2-theta; a PXRD pattern as depicted in FIG. 2; or combinations of these data.

Form 1 of ripretinib may be further characterized by the PXRD pattern having peaks at 9.3, 11.8, 17.2, 24.4 and 27.0 degrees 2-theta±0.2 degrees 2-theta, and also having one, two, three, four or five additional peaks at 7.4, 10.8, 18.6, 20.5 and 23.7 degrees 2-theta±0.2 degrees 2-theta.

Alternatively, Form 1 of ripretinib may be characterized by a PXRD pattern having peaks at 7.4, 9.3, 10.8, 11.8, 17.2, 18.6, 20.5, 23.7, 24.4 and 27.0 degrees 2-theta±0.2 degrees 2-theta.

In any embodiment of the present invention Form 1 of ripretinib may alternatively or additionally be characterized by a solid state 13C NMR spectrum having peaks at 162.9, 160.0, 139.5, 128.9, 121.6±0.2 ppm. Form 1 of ripretinib may alternatively or additionally be characterized by a solid state 13C NMR spectrum having the following chemical shift absolute differences from a reference peak at 87.4 ppm±0.2 ppm of 75.5, 72.6, 52.1, 41.5, 34.2f 0.1 ppm. In any embodiment of the present invention, Form 1 of ripretinib may alternatively or additionally be characterized by a solid state 13C NMR spectrum substantially as depicted in FIG. 9.

Form 1 of ripretinib may be characterized by each of the above characteristics alone or by all possible combinations, e.g., by a PXRD pattern having peaks at 9.3, 11.8, 17.2, 24.4 and 27.0 degrees 2-theta±0.2 degrees 2-theta and a PXRD pattern as depicted in FIG. 1.

Form 1 of ripretinib according to any of the above embodiments may be an anhydrous form. In any embodiment of the present invention, Form 1 may be non-hygroscopic.

The present disclosure further includes a solid state form of ripretinib designated as Form 3. Form 3 of ripretinib can be characterized by data selected from one or more of the following: a PXRD pattern having peaks at 6.5, 9.3, 9.8, 11.8 and 13.1 degrees 2-theta±0.2 degrees 2-theta; a PXRD pattern as depicted in FIG. 3; or combinations of these data.

In any embodiment of the present invention Form 3 of ripretinib may alternatively or additionally be characterized by data selected from one or more of the following: a PXRD pattern having peaks at 6.5, 9.3, 9.8, 11.8 and 13.1 degrees 2-theta±0.2 degrees 2-theta; a PXRD pattern as depicted in FIG. 4; or combinations of these data.

Form 3 of ripretinib may be further characterized by the PXRD pattern having peaks at 6.5, 9.3, 9.8, 11.8 and 13.1 degrees 2-theta±0.2 degrees 2-theta, and also having one, two, three, four or five additional peaks at 10.8, 14.4, 17.2, 20.5 and 27.0 degrees 2-theta±0.2 degrees 2-theta.

Alternatively, Form 3 of ripretinib may be characterized by a PXRD pattern having peaks at 6.5, 9.3, 9.8, 10.8, 11.8, 13.1, 14.4, 17.2, 20.5 and 27.0 degrees 2-theta±0.2 degrees 2-theta.

In any embodiment of the present invention Form 3 of ripretinib may alternatively or additionally be characterized by a solid state 13C NMR spectrum having peaks at 160.1, 151.3, 139.1, 118.9, 109.4±0.2 ppm. Form 3 of ripretinib may alternatively or additionally be characterized by a solid state 13C NMR spectrum having the following chemical shift absolute differences from a reference peak at 89.4 ppm±0.2 ppm of 70.7, 61.9, 49.7, 29.5, 20.0±0.1 ppm. In any embodiment of the present invention, Form 3 of ripretinib may alternatively or additionally be characterized by a solid state 13C NMR spectrum substantially as depicted in FIG. 10.

Form 3 of ripretinib may be characterized by each of the above characteristics alone or by all possible combinations, e.g., by a PXRD pattern having peaks at 6.5, 9.3, 9.8, 11.8 and 13.1 degrees 2-theta±0.2 degrees 2-theta and a PXRD pattern as depicted in FIG. 3.

Form 3 of ripretinib according to any of the above embodiments may be a hydrate form.

The present disclosure further includes a solid state form of ripretinib designated as amorphous form. Amorphous form of ripretinib can be characterized by a PXRD pattern as depicted in FIG. 5.

The present disclosure further includes a solid state form of ripretinib designated as Form 4. Form 4 of ripretinib can be characterized by data selected from one or more of the following: a PXRD pattern having peaks at 6.7, 12.5, 18.9, 21.9 and 26.0 degrees 2-theta±0.2 degrees 2-theta; a PXRD pattern as depicted in FIG. 6; or combinations of these data.

Form 4 of ripretinib may be further characterized by the PXRD pattern having peaks at 6.7, 12.5, 18.9, 21.9 and 26.0 degrees 2-theta±0.2 degrees 2-theta, and also having one, two, three, four or five additional peaks at 7.0, 11.6, 13.5, 16.1 and 24.2 degrees 2-theta±0.2 degrees 2-theta.

Alternatively, Form 4 of ripretinib may be characterized by a PXRD pattern having peaks at 6.7, 7.0, 11.6, 12.5, 13.5, 16.1, 18.9, 21.9, 24.2 and 26.0 degrees 2-theta±0.2 degrees 2-theta.

Form 4 of ripretinib may be characterized by each of the above characteristics alone or by all possible combinations, e.g., by a PXRD pattern having peaks at 6.7, 12.5, 18.9, 21.9 and 26.0 degrees 2-theta±0.2 degrees 2-theta and a PXRD pattern as depicted in FIG. 6.

Form 4 of ripretinib according to any of the above embodiments may be a DMSO/H$_2$O solvate.

The present disclosure further includes a solid state form of ripretinib designated as Form 5. Form 5 of ripretinib can be characterized by data selected from one or more of the following: a PXRD pattern having peaks at 7.0, 8.0, 12.7, 20.1 and 26.5 degrees 2-theta±0.2 degrees 2-theta; a PXRD pattern as depicted in FIG. 7; or combinations of these data.

Form 5 of ripretinib may be further characterized by the PXRD pattern having peaks at 7.0, 8.0, 12.7, 20.1 and 26.5 degrees 2-theta±0.2 degrees 2-theta, and also having one, two, three, four or five additional peaks at 11.4, 14.4, 17.6, 24.4 and 25.3 degrees 2-theta±0.2 degrees 2-theta.

Alternatively, Form 5 of ripretinib may be characterized by a PXRD pattern having peaks at 7.0, 8.0, 11.4, 12.7, 14.4, 17.6, 20.1, 24.4, 25.3 and 26.5 degrees 2-theta±0.2 degrees 2-theta.

Form 5 of ripretinib may be characterized by each of the above characteristics alone or by all possible combinations, e.g., by a PXRD pattern having peaks at 7.0, 8.0, 12.7, 20.1 and 26.5 degrees 2-theta±0.2 degrees 2-theta and a PXRD pattern as depicted in FIG. 7.

Form 5 of ripretinib according to any of the above embodiments may be an acetic acid solvate.

The present disclosure further includes a solid state form of ripretinib designated as Form 9. Form 9 of ripretinib can be characterized by data selected from one or more of the following: a PXRD pattern having peaks at 6.4, 12.8, 16.2, 20.7 and 24.7 degrees 2-theta±0.2 degrees 2-theta; a PXRD pattern as depicted in FIG. 8; or combinations of these data.

Form 9 of ripretinib may be further characterized by the PXRD pattern having peaks at 6.4, 12.8, 16.2, 20.7 and 24.7 degrees 2-theta±0.2 degrees 2-theta, and also having one, two, three, four or five additional peaks at 18.9, 20.4, 22.8, 23.4, and 33.4 degrees 2-theta±0.2 degrees 2-theta.

Alternatively, Form 9 of ripretinib may be characterized by a PXRD pattern having peaks at 6.4, 12.8, 16.2, 18.9, 20.4, 20.7, 22.8, 23.4, 24.7 and 33.4 degrees 2-theta±0.2 degrees 2-theta.

Form 9 of ripretinib may be characterized by each of the above characteristics alone or by all possible combinations, e.g., by a PXRD pattern having peaks at 6.4, 12.8, 16.2, 20.7 and 24.7 degrees 2-theta±0.2 degrees 2-theta and a PXRD pattern as depicted in FIG. 8.

Form 9 of ripretinib according to any of the above embodiments may be a DMSO solvate.

The present disclosure also provides the use of the solid state forms of ripretinib of the present disclosure for preparing different solid state forms of ripretinib, salts of ripretinib and solid state forms thereof.

The present disclosure further encompasses processes for preparing the solid state forms of ripretinib of the present disclosure. The disclosure further includes processes for preparing different solid state forms of ripretinib or salts of ripretinib and solid state forms thereof. The process includes preparing at least one of the solid state forms of ripretinib of the present disclosure, and converting it to different solid state forms of ripretinib or salts of ripretinib and solid state forms thereof. The conversion can be done, for example, by a process including reacting at least one of the obtained solid state forms of ripretinib with an appropriate acid to obtain ripretinib acid addition salt.

In another embodiment the present disclosure encompasses the above described solid state forms of ripretinib for use in the preparation of pharmaceutical compositions and/or formulations, in embodiments for the treatment of GIST.

In another embodiment the present disclosure encompasses the use of the above described solid state forms of ripretinib for the preparation of pharmaceutical compositions and/or formulations.

The present disclosure further provides pharmaceutical compositions including the solid state forms of ripretinib of the present disclosure.

In yet another embodiment, the present disclosure encompasses pharmaceutical formulations including solid state forms of ripretinib of the present disclosure, and at least one pharmaceutically acceptable excipient. The pharmaceutical formulations according to the present disclosure may be for oral administration in a form of a tablet or a capsule.

Pharmaceutical formulations of the present invention contain any one or a combination of the solid state forms of ripretinib of the present disclosure. In addition to the active ingredient, the pharmaceutical formulations of the present disclosure can contain one or more excipients. Excipients are added to the formulation for a variety of purposes.

Diluents increase the bulk of a solid pharmaceutical composition, and can make a pharmaceutical dosage form containing the composition easier for the patient and caregiver to handle. Diluents for solid compositions include, for example, microcrystalline cellulose (e.g. Avicel®), microfine cellulose, lactose, starch, pregelatinized starch, calcium carbonate, calcium sulfate, sugar, dextrates, dextrin, dextrose, dibasic calcium phosphate dihydrate, tribasic calcium phosphate, kaolin, magnesium carbonate, magnesium oxide, maltodextrin, mannitol, polymethacrylates (e.g. Eudragit®), potassium chloride, powdered cellulose, sodium chloride, sorbitol, and talc.

Solid pharmaceutical compositions that are compacted into a dosage form, such as a tablet, can include excipients whose functions include helping to bind the active ingredient and other excipients together after compression. Binders for solid pharmaceutical compositions include acacia, alginic acid, carbomer (e.g. carbopol), carboxymethylcellulose sodium, dextrin, ethyl cellulose, gelatin, guar gum, hydrogenated vegetable oil, hydroxyethyl cellulose, hydroxypropyl cellulose (e.g. Klucel®), hydroxypropyl methyl cellulose (e.g. Methocel®), liquid glucose, magnesium aluminum silicate, maltodextrin, methylcellulose, polymethacrylates, povidone (e.g. Kollidon®, Plasdone®), pregelatinized starch, sodium alginate, and starch.

The dissolution rate of a compacted solid pharmaceutical composition in the patient's stomach can be increased by the addition of a disintegrant to the composition. Disintegrants include alginic acid, carboxymethylcellulose calcium, carboxymethylcellulose sodium (e.g. Ac-Di-Sol®, Primellose®), colloidal silicon dioxide, croscarmellose sodium, crospovidone (e.g. Kollidon®, Polyplasdone®), guar gum, magnesium aluminum silicate, methyl cellulose, microcrystalline cellulose, polacrilin potassium, powdered cellulose, pregelatinized starch, sodium alginate, sodium starch glycolate (e.g. Explotab®), and starch.

Glidants can be added to improve the flowability of a non-compacted solid composition and to improve the accuracy of dosing. Excipients that can function as glidants include colloidal silicon dioxide, magnesium trisilicate, powdered cellulose, starch, talc, and tribasic calcium phosphate.

When a dosage form such as a tablet is made by the compaction of a powdered composition, the composition is subjected to pressure from a punch and dye. Some excipients and active ingredients have a tendency to adhere to the surfaces of the punch and dye, which can cause the product to have pitting and other surface irregularities. A lubricant can be added to the composition to reduce adhesion and ease the release of the product from the dye. Lubricants include magnesium stearate, calcium stearate, glyceryl monostearate, glyceryl palmitostearate, hydrogenated castor oil, hydrogenated vegetable oil, mineral oil, polyethylene glycol, sodium benzoate, sodium lauryl sulfate, sodium stearyl fumarate, stearic acid, talc, and zinc stearate.

Flavoring agents and flavor enhancers make the dosage form more palatable to the patient. Common flavoring agents and flavor enhancers for pharmaceutical products that can be included in the composition of the present invention include maltol, vanillin, ethyl vanillin, menthol, citric acid, fumaric acid, ethyl maltol, and tartaric acid.

Solid and liquid compositions can also be dyed using any pharmaceutically acceptable colorant to improve their appearance and/or facilitate patient identification of the product and unit dosage level.

In liquid pharmaceutical compositions of the present disclosure, the active ingredient and any other solid excipients may be dissolved or suspended in a liquid carrier such as water, vegetable oil, alcohol, polyethylene glycol, propylene glycol, or glycerin.

Liquid pharmaceutical compositions can contain emulsifying agents to disperse uniformly throughout the composition an active ingredient or other excipient that is not soluble in the liquid carrier. Emulsifying agents that can be useful in liquid compositions of the present invention include, for example, gelatin, egg yolk, casein, cholesterol, acacia, tragacanth, chondrus, pectin, methyl cellulose, carbomer, cetostearyl alcohol, and cetyl alcohol.

Liquid pharmaceutical compositions of the present disclosure can also contain a viscosity enhancing agent to improve the mouth-feel of the product and/or coat the lining of the gastrointestinal tract. Such agents include acacia, alginic acid bentonite, carbomer, carboxymethylcellulose calcium or sodium, cetostearyl alcohol, methyl cellulose, ethylcellulose, gelatin guar gum, hydroxyethyl cellulose, hydroxypropyl cellulose, hydroxypropyl methyl cellulose, maltodextrin, polyvinyl alcohol, povidone, propylene carbonate, propylene glycol alginate, sodium alginate, sodium starch glycolate, starch tragacanth, and xanthan gum.

Sweetening agents such as sorbitol, saccharin, sodium saccharin, sucrose, aspartame, fructose, mannitol, and invert sugar can be added to improve the taste.

Preservatives and chelating agents such as alcohol, sodium benzoate, butylated hydroxyl toluene, butylated hydroxyanisole, and ethylenediamine tetraacetic acid can be added at levels safe for ingestion to improve storage stability.

According to the present disclosure, a liquid composition can also contain a buffer such as gluconic acid, lactic acid, citric acid, or acetic acid, sodium gluconate, sodium lactate, sodium citrate, or sodium acetate. Selection of excipients and the amounts used can be readily determined by the formulation scientist based upon experience and consideration of standard procedures and reference works in the field.

The solid compositions of the present disclosure include powders, granulates, aggregates, and compacted compositions. The dosages include dosages suitable for oral, buccal, rectal, parenteral (including subcutaneous, intramuscular, and intravenous), inhalant, and ophthalmic administration. Although the most suitable administration in any given case will depend on the nature and severity of the condition being treated, the most preferred route of the present disclosure is oral. The dosages can be conveniently presented in unit dosage form and prepared by any of the methods well-known in the pharmaceutical arts.

Dosage forms include solid dosage forms like tablets, powders, capsules, suppositories, sachets, troches, and lozenges, as well as liquid syrups, suspensions, and elixirs.

The dosage form of the present disclosure can be a capsule containing the composition, such as a powdered or granulated solid composition of the invention, within either a hard or soft shell. The shell can be made from gelatin and optionally contain a plasticizer such as glycerin and sorbitol, and an opacifying agent or colorant.

The active ingredient and excipients can be formulated into compositions and dosage forms according to methods known in the art.

A composition for tableting or capsule filling can be prepared by wet granulation. In wet granulation, some or all of the active ingredients and excipients in powder form are blended and then further mixed in the presence of a liquid, typically water, that causes the powders to clump into granules. The granulate is screened and/or milled, dried, and then screened and/or milled to the desired particle size. The granulate can then be tableted, or other excipients can be added prior to tableting, such as a glidant and/or a lubricant.

A tableting composition can be prepared conventionally by dry blending. For example, the blended composition of the actives and excipients can be compacted into a slug or a sheet and then comminuted into compacted granules. The compacted granules can subsequently be compressed into a tablet.

As an alternative to dry granulation, a blended composition can be compressed directly into a compacted dosage form using direct compression techniques. Direct compression produces a more uniform tablet without granules. Excipients that are particularly well suited for direct compression tableting include microcrystalline cellulose, spray dried lactose, dicalcium phosphate dihydrate, and colloidal silica. The proper use of these and other excipients in direct compression tableting is known to those in the art with experience and skill in particular formulation challenges of direct compression tableting.

A capsule filling of the present invention can comprise any of the aforementioned blends and granulates that were described with reference to tableting, but they are not subjected to a final tableting step.

In further embodiments, a pharmaceutical formulation of ripretinib is formulated for administration to a mammal, such as a human. Ripretinib can be formulated, for example, as a viscous liquid solution or suspension, such as a clear solution, for injection. The formulation can contain one or more solvents. A suitable solvent can be selected by considering the solvent's physical and chemical stability at various pH levels, viscosity (which would allow for syringeability), fluidity, boiling point, miscibility, and purity. Suitable solvents include alcohol USP, benzyl alcohol NF, benzyl benzoate USP, and Castor oil USP. Additional substances can be added to the formulation such as buffers, solubilizers, and antioxidants, among others. Ansel et al., Pharmaceutical Dosage Forms and Drug Delivery Systems, 7th ed.

The present disclosure encompasses a process to prepare said formulations of solid state forms of ripretinib by combining the solid state forms prepared according to the present disclosure and at least one pharmaceutically acceptable excipient.

Solid state forms of ripretinib as defined herein, as well as the pharmaceutical compositions or formulations of ripretinib can be used as medicaments, in embodiments for the treatment of GIST.

The present disclosure also provides a method of treating of GIST, by administering a therapeutically effective amount of the solid state forms of ripretinib prepared according to the present disclosure, or at least one of the above pharmaceutical compositions or formulations, to a subject suffering from GIST, or otherwise in need of the treatment.

The present disclosure also provides the use of solid state forms of ripretinib, or at least one of the above pharmaceutical compositions or formulations for the manufacture of a medicament for treating GIST.

Having described the solid state forms of ripretinib with reference to certain exemplary embodiments, other embodiments will become apparent to one skilled in the art from consideration of the specification. The disclosure is further illustrated by reference to the following examples describing in detail the preparation of the composition and methods of use of the disclosure. It will be apparent to those skilled in the art that many modifications, both to materials and methods, may be practiced without departing from the scope of the disclosure.

Analytical Methods

Powder X-Ray Diffraction Pattern ("PXRD") Method:

Sample is powdered in a mortar and pestle and applied directly on a silicon plate holder. The X-ray powder diffraction pattern was measured with Philips X'Pert PRO X-ray powder diffractometer, equipped with Cu irradiation source=1.54184 Å (Å ngström), X'Celerator (2.022° 2θ) detector. Scanning parameters: angle range: 3-40 deg., step size 0.0167, time per step 37 seconds, continuous scan.

The described peak positions were determined without using silicon powder as an internal standard in an admixture with the sample measured.

$^{13}$C Solid State Nuclear Magnetic Resonance ("ss-NMR" or 13C Solid State NMR) Method Solid state NMR spectra were measured at 11.7 T using a Bruker Avance III HD 500 US/WB NMR spectrometer (Karlsruhe, Germany, 2013). The $^{13}$C CP/MAS NMR spectra employing cross-polarization were acquired using the standard pulse scheme at spinning frequency of 12 kHz. The recycle delay was 8 s and the cross-polarization contact time was 2 ms. The strength of spin-locking fields $B_1(^{13}C)$ expressed in frequency units ω ½π=γB1 was 64 kHz.

The $^{13}$C NMR scale was referenced to a-glycine (176.03 ppm). Frictional heating of the spinning samples was offset by active cooling, and the temperature calibration was performed with $Pb(NO_3)_2$. The NMR spectrometer was completely calibrated and all experimental parameters were carefully optimized prior to the investigation. Magic angle was set using KBr during standard optimization procedure and homogeneity of magnetic field was optimized using adamantane sample (resulting line-width at half-height Dn1/2 was less than 3.5 Hz at 250 ms of acquisition time).

EXAMPLES

Ripretinib can be prepared according to any known method, for example the procedure described in U.S. Pat. No. 8,461,179.

Example 1: Preparation of Ripretinib Form 1

A suspension of ripretinib (20 mg) in acetonitrile (10 mL) was heated to the boiling point. The suspension was cooled down to room temperature. The solid was isolated by vacuum filtration. The obtained solid corresponds to ripretinib form 1 as confirmed by PXRD.

Example 2: Preparation of Ripretinib Form 1

A suspension of ripretinib (200 mg) in acetonitrile (100 mL) was heated to the boiling point. The suspension was cooled down to room temperature. The solid was isolated by vacuum filtration. The obtained solid corresponds to ripretinib form 1 as confirmed by PXRD.

Example 3: Preparation of Ripretinib Form 1

A suspension of ripretinib (20 mg) in different solvents (triethylamine, amyl acetate, amyl alcohol, i-butanol, i-butyl acetate, n-butyl acetate, sec-butyl acetate, tert-butyl acetate, cumene, 1,2-dichloroethene, 1,2-dichloroethane, cyclomethylethyl ether, diethyl malonate, diethoxymethane, diisopropyl ether, ethyl acetoacetate, ethylbenzene, 1-propanol, i-propyl acetate, n-propyl acetate, 1,2-propylene carbonate, 3-pentanone, m-xylene) (10 mL) was heated to the boiling point. The suspension was cooled down to room temperature. The solid was isolated by vacuum filtration. The obtained solid corresponds to ripretinib form 1 as confirmed by PXRD.

Example 4: Preparation of Ripretinib Form 3

A suspension of Ripretinib (20 mg) in different solvents (10 mL, water; mixture of 3% acetone in water; or mixture of 1% methanol in water) was heated to the boiling point. The suspension was cooled down to room temperature. The solid was isolated by vacuum filtration. The obtained solid corresponds to ripretinib form 3 as confirmed by PXRD.

Example 5: Preparation of Ripretinib Form 3

A suspension of Ripretinib (200 mg) in mixture of 3% acetone in water (100 mL) was heated to the boiling point. The suspension was cooled down to room temperature. The solid was isolated by vacuum filtration. The obtained solid corresponds to ripretinib form 3 as confirmed by PXRD.

Example 6: Preparation of Ripretinib Form 3

A suspension of Ripretinib (400 mg) in mixture of 3% acetone in water (200 mL) was heated to the boiling point. The suspension was cooled down to room temperature. The solid was isolated by vacuum filtration. The obtained solid corresponds to ripretinib form 3 as confirmed by PXRD.

Example 7: Preparation of Amorphous Ripretinib

Ripretinib (500 mg) was subjected to milling in ball mill (agate jar, 2 agate balls φ=7 mm, frequency: 25 Hz, time: 6 hours). The obtained solid corresponds to amorphous ripretinib as confirmed by PXRD.

Example 8: Preparation of Amorphous Ripretinib

Ripretinib (4 grams) was subjected to milling in ball mill (zirconium oxide jar, 7 zirconium oxide balls, 4=9 mm, frequency: 800 rpm, time: 6 hours). The obtained solid corresponds to amorphous ripretinib as confirmed by PXRD.

Example 9: Preparation of Ripretinib Form 4

Ripretinib (500 mg) was dissolved in dimethyl sulfoxide (30 mL). The obtained clear solution was filtered and was frozen using a liquid nitrogen bath within 10 minutes, and lyophilized for 72 hours (temperature −40° C., pressure 270-330 μbar). The obtained solid corresponds to ripretinib form 4 as confirmed by PXRD.

Example 10: Preparation of Ripretinib Form 5

A suspension of Ripretinib (200 mg) in mixture of acetic acid (60 mL) was heated to the boiling point. The solution was cooled down to the room temperature. The solid was isolated by vacuum filtration. The obtained solid corresponds to ripretinib form 5 as confirmed by PXRD.

Example 11: Preparation of Ripretinib Form 1

A suspension of Ripretinib (50 mg, amorphous form) and acetone or methanol (2 mL) was stirred in closed clear glass vial at 450 rpm for 1 day at room temperature. The solid was isolated by vacuum filtration. Ripretinib Form 1 was obtained as confirmed by PXRD.

Example 12: Preparation of Ripretinib Form 1

Ripretinib (120 mg, amorphous form) was dissolved in NMP (N-methylpyrrolidone) (11 ml) at room temperature, and water (previously cooled to 0-5° C.) was added dropwise in solution (44 ml). The crystallization was momentary. Obtained solid was isolated by vacuum filtration. Ripretinib Form 1 was obtained as confirmed by PXRD.

Example 13: Preparation of Ripretinib Form 1

Ripretinib (305 mg, amorphous form) was dissolved in solvent mixture DMSO:Water (16 ml, 9:1 volume ratio) at 50° C., and water (previously cooled to 0-5° C.) was added dropwise in solution (64 ml), and additionally stirred at 450 rpm for 1 hour. Obtained solid was isolated by vacuum filtration. Ripretinib Form 1 was obtained as confirmed by PXRD.

Example 14: Preparation of Ripretinib Form 1

Ripretinib (314 mg, amorphous form) was dissolved in solvent mixture DMSO:Water (35 ml, 9:1 volume ratio) at 80° C., and water (water temperature approximately 25° C.) (105 ml) was added dropwise in solution, and additionally stirred at 450 rpm for 1 hour. Obtained solid was isolated by vacuum filtration. Ripretinib Form 1 was obtained as confirmed by PXRD.

Example 15: Preparation of Ripretinib Form 1

Ripretinib (1960 mg, amorphous form) was dissolved in solvent mixture DMSO:Water (300 ml, 9:1 volume ratio) at 60° C. (in 1 L reactor) and water (water temperature approximately 25° C.) (300 ml) was added dropwise in solution, and additionally stirred (mechanical stirrer) at 250 rpm for 1 hour. Obtained solid was isolated by vacuum filtration. Ripretinib Form 1 was obtained as confirmed by PXRD.

Example 16: Preparation of Ripretinib Form 9

Ripretinib (305 mg, amorphous form) was dissolved in solvent mixture DMSO:Water (60 ml, 9:1 volume ratio) at room temperature, and water (previously cooled to 0-5° C.) (180 ml) was added dropwise in solution. Solution was crystallized after 13 ml of added water, and additionally stirred at 450 rpm for 1 hour. Obtained solid was isolated by vacuum filtration. Ripretinib Form 9 was obtained as confirmed by PXRD.

Example 17: Preparation of Ripretinib Form 9

Ripretinib (329 mg, amorphous form) was dissolved in solvent mixture DMSO:Water (35 ml, 9:1 volume ratio) at 40° C., and water (water temperature approximately 25° C.) (105 ml) was added dropwise in solution, and additionally stirred at 450 rpm for 1 hour. Obtained solid was isolated (302 mg, Yield: 91.7%) by vacuum filtration. Ripretinib Form 9 was obtained as confirmed by PXRD.

Example 18: Preparation of Ripretinib Form 3

A suspension of Ripretinib (50 mg, form 9) and solvent mixture acetone:Water (2 ml, 1:9 volume ratio) was stirred in closed clear glass vial at 350 rpm for 3 days at room temperature. The solid was isolated by vacuum filtration. Ripretinib Form 3 was obtained as confirmed by PXRD.

Example 19: Preparation of Ripretinib Form 3

A suspension of Ripretinib (620 mg, form 9) and solvent mixture Acetone:Water (20 ml, 1:9 volume ratio) was stirred at 500 rpm for 90 min at 70° C. The solid was isolated by vacuum filtration. Ripretinib Form 3 was obtained as confirmed by PXRD.

Example 20: Preparation of Ripretinib Form 1

Ripretinib (307 mg, amorphous form) was dissolved in solvent mixture DMSO:Water (37 ml, 9:1 volume ratio) at 60° C., and water was added dropwise in solution (74 ml), and additional stirred by 450 rpm for 1 hour. Solution was crystallized after 13 ml of water was added. Obtained solid was isolated by vacuum filtration. Ripretinib Form 1 was obtained as confirmed by PXRD.

Example 21: Preparation of Ripretinib Form 1

A suspension of Ripretinib (50 mg, amorphous form) and acetone (2 mL) or methanol (2 mL) was stirred in closed clear glass vial at 450 rpm for 1 day at room temperature. The solid was isolated by vacuum filtration. Ripretinib Form 1 was obtained as confirmed by PXRD.

Example 22: Preparation of Amorphous Ripretinib

Ripretinib (500 mg, form 1) was subjected to milling in ball mill (agate jar, 2 agate balls 4=7 mm, frequency: 25 Hz, time: 6 hours). The obtained solid corresponds to amorphous ripretinib as confirmed by PXRD.

The invention claimed is:

1. A solid state form of ripretinib designated as Form 1, characterized by data selected from one or more of the following:
   a PXRD pattern having peaks at: 9.3, 11.8, 17.2, 24.4 and 27.0 degrees 2-theta±0.2 degrees 2-theta;
   a PXRD pattern substantially as depicted in FIG. 1 or FIG. 2;
   a solid state $^{13}$C NMR spectrum having peaks at 162.9, 160.0, 139.5, 128.9, and 121.6±0.2 ppm;
   a solid state $^{13}$C NMR spectrum having chemical shift absolute differences from a reference peak at 87.4 ppm±0.2 ppm of 75.5, 72.6, 52.1, 41.5, and 34.2±0.1 ppm; or
   a solid state $^{13}$C NMR spectrum substantially as depicted in FIG. 9.

2. The solid state Form 1 of ripretinib according to claim 1, wherein said solid state form is characterized by a PXRD pattern having peaks at 9.3, 11.8, 17.2, 24.4 and 27.0 degrees 2-theta±0.2 degrees 2-theta, and also having one, two, three, four or five additional peaks at 7.4, 10.8, 18.6, 20.5 and 23.7 degrees 2-theta±0.2 degrees 2-theta.

3. The solid state Form 1 of ripretinib according to claim 1, wherein said solid state form is characterized by a PXRD pattern having peaks at: 7.4, 9.3, 10.8, 11.8, 17.2, 18.6, 20.5, 23.7, 24.4 and 27.0 degrees 2-theta±0.2 degrees 2-theta.

4. A solid state form of ripretinib designated as Form 3, characterized by data selected from one or more of the following:
   a PXRD pattern having peaks at: 6.5, 9.3, 9.8, 11.8 and 13.1 degrees 2-theta±0.2 degrees 2-theta;
   a PXRD pattern substantially as depicted in FIG. 3 or FIG. 4;
   a solid state $^{13}$C NMR spectrum having peaks at 160.1, 151.3, 139.1, 118.9, and 109.4±0.2 ppm;
   a solid state $^{13}$C NMR spectrum having chemical shift absolute differences from a reference peak at 89.4 ppm±0.2 ppm of 70.7, 61.9, 49.7, 29.5, and 20.0±0.1 ppm; or
   a solid state $^{13}$C NMR spectrum substantially as depicted in FIG. 10.

5. The solid state Form 3 of ripretinib according to claim 4, wherein said solid state form is characterized by a PXRD pattern having peaks at 6.5, 9.3, 9.8, 11.8 and 13.1 degrees 2-theta±0.2 degrees 2-theta, and also having one, two, three, four or five additional peaks at 10.8, 14.4, 17.2, 20.5 and 27.0 degrees 2-theta±0.2 degrees 2-theta.

6. The solid state Form 3 of ripretinib according to claim 4, wherein said solid state form is characterized by a PXRD pattern having peaks at: 6.5, 9.3, 9.8, 10.8, 11.8, 13.1, 14.4, 17.2, 20.5 and 27.0 degrees 2-theta±0.2 degrees 2-theta.

7. A solid state form of ripretinib designated as Form 9, characterized by data selected from one or more of the following:
   a PXRD pattern having peaks at: 6.4, 12.8, 16.2, 20.7 and 24.7 degrees 2-theta±0.2 degrees 2-theta; or
   a PXRD pattern substantially as depicted in FIG. 8.

8. The solid state Form 9 of ripretinib according to claim 7, wherein said solid state form is characterized by an XRPD pattern having peaks at 6.4, 12.8, 16.2, 20.7 and 24.7 degrees 2-theta±0.2 degrees 2-theta, and also having one, two, three, four or five additional peaks at 18.9, 20.4, 22.8, 23.4, and 33.4 degrees 2-theta±0.2 degrees 2-theta.

9. The solid state Form 9 of ripretinib according to claim 8, wherein said solid state form is characterized by a PXRD pattern having peaks at 6.4, 12.8, 16.2, 18.9, 20.4, 20.7, 22.8, 23.4, 24.7 and 33.4 degrees 2-theta±0.2 degrees 2-theta.

10. A pharmaceutical composition comprising a solid state form of ripretinib as defined in claim 1.

11. A pharmaceutical formulation comprising a solid state form of ripretinib as defined in claim 1, and at least one pharmaceutically acceptable excipient.

12. A process for preparing a pharmaceutical formulation comprising combining a solid state form of ripretinib as defined in claim 1 with at least one pharmaceutically acceptable excipient.

13. A method of treating gastrointestinal stromal tumors (GIST), advanced systemic mastocytosis (ASM), gliomas, and other solid tumors driven by tyrosine-protein kinase KIT (KIT) or platelet derived growth factor alpha (PDGFRα) kinase by administering the solid state form of ripretinib of claim 1 to a patient.

* * * * *